United States Patent
Selfon

(10) Patent No.: US 12,464,305 B2
(45) Date of Patent: *Nov. 4, 2025

(54) SYSTEMS AND METHODS FOR AUDIO ADJUSTMENT

(71) Applicant: Meta Platforms Technologies, LLC, Menlo Park, CA (US)

(72) Inventor: Scott Phillip Selfon, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,385

(22) Filed: Aug. 8, 2022

(65) Prior Publication Data

US 2022/0386029 A1 Dec. 1, 2022

Related U.S. Application Data

(63) Continuation of application No. 16/846,068, filed on Apr. 10, 2020, now Pat. No. 11,425,523.

(51) Int. Cl.
*H04S 7/00* (2006.01)
*G10L 13/02* (2013.01)
*H04R 1/40* (2006.01)
*H04R 5/04* (2006.01)

(52) U.S. Cl.
CPC .............. *H04S 7/303* (2013.01); *G10L 13/02* (2013.01); *H04R 1/406* (2013.01); *H04R 5/04* (2013.01); *H04S 7/307* (2013.01); *H04R 2430/01* (2013.01)

(58) Field of Classification Search
CPC ......... H04S 7/303; H04S 7/307; G10L 13/02; G06F 3/165; G06F 3/162; G06F 3/16; H04R 1/406; H04R 5/04; H04R 2430/01
See application file for complete search history.

(56) References Cited

U.S. PATENT DOCUMENTS

| | | | |
|---|---|---|---|
| 5,278,910 A * | 1/1994 | Suzuki | G10L 21/0364 704/E21.009 |
| 7,684,977 B2 * | 3/2010 | Morikawa | G10L 15/22 704/211 |
| 9,955,280 B2 * | 4/2018 | Järvinen | H04M 3/568 |
| 2008/0086308 A1 * | 4/2008 | Kindo | H04W 4/10 704/270.1 |
| 2013/0259243 A1 | 10/2013 | Herre et al. | |
| 2016/0275936 A1 * | 9/2016 | Thorn | G10L 15/063 |
| 2018/0373488 A1 | 12/2018 | Chisu et al. | |
| 2020/0128348 A1 | 4/2020 | Eronen et al. | |

(Continued)

*Primary Examiner* — Fan S Tsang
*Assistant Examiner* — David Siegel
(74) *Attorney, Agent, or Firm* — Greenberg Traurig, LLP

(57) ABSTRACT

An audio system includes a sound output device, a microphone, and processing circuitry. The microphone is configured to capture environmental audio. The processing circuitry is configured to analyze the environmental audio to identify one or more properties of environmental audio conditions. The processing circuitry is configured to adjust one or more sound presentation parameters based on the one or more properties of the environmental audio conditions to account for the environmental audio conditions. The processing circuitry is configured to operate the sound output device to output audio according to the one or more sound presentation parameters.

17 Claims, 7 Drawing Sheets

(56) References Cited

U.S. PATENT DOCUMENTS

2020/0357374 A1 11/2020 Verweij et al.
2021/0097980 A1* 4/2021 Lezzoum .............. G10L 13/033
2023/0290346 A1* 9/2023 Smith .................... G10L 15/20

* cited by examiner

SYSTEMS AND METHODS FOR AUDIO ADJUSTMENT

CROSS-REFERENCE TO RELATED PATENT APPLICATION

This application is a continuation of U.S. application Ser. No. 16/846,068, filed Apr. 10, 2020, the entire disclosure of which is incorporated by reference herein.

FIELD OF DISCLOSURE

The present disclosure is generally related to audio systems, including but not limited to head wearable audio systems.

BACKGROUND

The present disclosure generally relates to improving perceptibility of speech in sound output by an audio system. If environmental conditions are noisy, a user may experience reduced perceptibility or intelligibility of sounds output by the audio system. In particular, the environment may include directional background noises that arrive at the user or the audio system at an arrival direction. Such directional or background noises may interfere with a frequency of sound output by the audio system.

SUMMARY

Various embodiments disclosed herein are related to an audio system. The audio system includes a sound output device, a microphone, and processing circuitry, according to some embodiments. The microphone is configured to capture environmental audio, according to some embodiments. The processing circuitry is configured to analyze the environmental audio to identify one or more properties of environmental audio conditions, according to some embodiments. In some embodiments, the processing circuitry is configured to adjust one or more speech presentation parameters based on the one or more properties of the environmental audio conditions to account for the environmental audio conditions. In some embodiments, the processing circuitry is configured to operate the sound output device to output audio according to the one or more speech presentation parameters.

In some embodiments, the one or more properties of environmental audio conditions include at least one of an amplitude of the environmental audio or an amplitude of the environmental audio within one or more particular frequency ranges.

In some embodiments, the particular frequency range includes a frequency of the output audio of the sound output device.

In some embodiments, the audio system further includes a first microphone and a second microphone configured to capture the environmental audio. In some embodiments, the processing circuitry is configured to compare environmental audio captured by the first microphone to environmental audio captured by the second microphone to determine an arrival direction of the environmental audio relative to the audio system as one of the one or more properties of the environmental audio conditions. In some embodiments, the processing circuitry is configured to perform a simulation of a virtual spatial position from which a sound originates relative to the audio system to generate the output audio for the sound output device. In some embodiments, the processing circuitry is configured to adjust the virtual spatial position from which the audio output originates based on the arrival direction of the environmental audio relative to the audio system.

In some embodiments, the processing circuitry is configured to operate the sound output device to provide an aural notification to a user that the virtual spatial position is adjusted.

In some embodiments, the speech presentation parameters include any of a direction of arrival, a speech delivery style, an amplitude, or an amplitude across one or more frequency ranges of the output audio.

In some embodiments, the processing circuitry is configured to use a speech synthesizer to generate the audio output for the sound output device. In some embodiments, the processing circuitry is configured to adjust the speech synthesizer based on the one or more properties of the environmental audio conditions to generate an adjusted audio output for the sound output device that accounts for the environmental audio conditions. In some embodiments, the processing circuitry is configured to operate the sound output device to output the adjusted audio output.

In some embodiments, the audio system further includes a display screen configured to provide visual data to a user of the audio system. In some embodiments, the processing circuitry is configured to operate the display screen to provide the audio output of the sound output device as visual data in response to at least one of the one or more properties of the environmental audio conditions.

Various embodiments disclosed herein are related to a method for adjusting audio output. In some embodiments, the method includes obtaining environmental audio from a microphone of an audio device. In some embodiments, the method includes analyzing the environmental audio to identify one or more properties of environmental audio conditions. In some embodiments, the one or more properties include an amplitude of the environmental audio within one or more particular frequency ranges. In some embodiments, the method includes adjusting an audio output based on the one or more properties of the environmental audio conditions and the amplitude of the environmental audio within the particular frequency range to account for the environmental audio conditions.

In some embodiments, the one or more properties of environmental audio conditions include at least one of an amplitude of the environmental audio, the amplitude of the environmental audio within the particular frequency range, or an arrival direction of the environmental audio relative to the audio device.

In some embodiments, the method further includes obtaining environmental audio from a first microphone of the audio device and obtaining environmental audio from a second microphone of the audio device. In some embodiments, the method includes comparing the environmental audio obtained from the first microphone to the environmental audio obtained from the second microphone to determine the arrival direction of the environmental audio relative to the audio device. In some embodiments, the first microphone is positioned a distance from the second microphone.

In some embodiments, the method includes performing a simulation of a virtual spatial position from which a sound originates relative to the audio system to generate the audio output. In some embodiments, the method includes adjusting the virtual spatial position from which the audio output originates based on the arrival direction of the environmental audio relative to the audio device.

In some embodiments, the method includes providing an aural notification to a user that the virtual spatial position is adjusted.

In some embodiments, the method includes using a speech synthesizer to generate the audio output. In some embodiments, the method includes adjusting the speech synthesizer based on the one or more properties of the environmental audio conditions to generate an adjusted audio output that accounts for the environmental audio conditions. In some embodiments, the method includes providing the adjusted audio output to a user.

Various embodiments disclosed herein are related to a method for adjusting audio output. In some embodiments, the method includes obtaining environmental audio data from a first microphone and a second microphone of an audio device. In some embodiments, the method includes determining an arrival direction of environmental audio relative to the audio device based on a comparison between the environmental audio data obtained from the first microphone and the environmental audio data obtained from the second microphone. In some embodiments, the method includes adjusting a virtual spatial position of a spatial audio simulation based on the arrival direction of the environmental audio. In some embodiments, the spatial audio simulation includes simulating a sound at the virtual spatial position relative to the audio device to generate an audio output. In some embodiments, the method includes providing the audio output to a user.

In some embodiments, the method includes providing an aural notification to a user that the virtual spatial position is adjusted.

In some embodiments, the environmental audio data from the first microphone and the environmental audio data from the second microphone are obtained in real-time.

In some embodiments, the method includes determining an amplitude of the environmental audio based on at least one of the environmental audio data obtained from the first microphone or the environmental audio data obtained from the second microphone. In some embodiments, the method includes determining an amplitude of the environmental audio that is within a particular frequency range based on based on at least one of the environmental audio data obtained from the first microphone or the environmental audio data obtained from the second microphone. In some embodiments, the method includes adjusting the audio output provided to the user based on at least one of the amplitude of the environmental audio or the amplitude of the environmental audio that is within the particular frequency range.

In some embodiments, adjusting the audio output includes at least one of adjusting an amplitude of the audio output, adjusting a frequency or pitch of the audio output, or adjusting an amplitude of the audio output across a frequency range.

In some embodiments, the virtual spatial position of the spatial audio simulation is adjusted to maintain a separation between the virtual spatial position and the arrival direction of the environmental audio.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Overview

Figure 1:
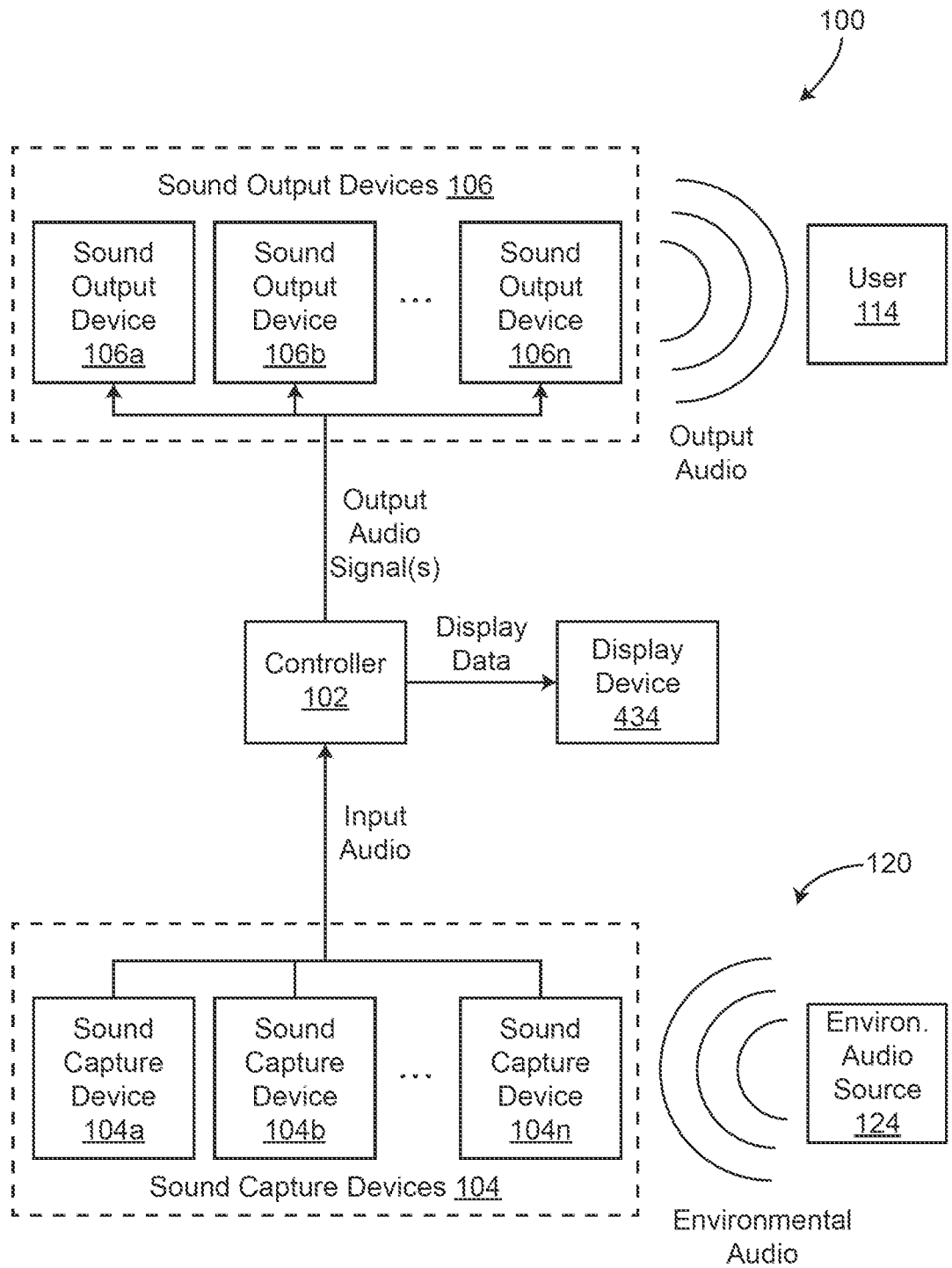
FIG. 1 is a block diagram of a system for sound output adjustment based on environmental audio, according to some embodiments.

Before turning to the FIGURES, which illustrate certain embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, systems and methods for adjusting or modifying audio output by an audio device are shown. The audio may be adjusted to account for environmental or background noises to improve perceptibility of the audio. An audio system may include one or more sound capture devices (e.g., microphones, acoustic transducers, etc.) that are at least partially positioned in the environment and configured to obtain audio data or audio signals indicating environmental audio conditions or background noises (e.g., directional noises in the environment). The audio system can also include processing circuitry, a display device (e.g., a screen, a touch screen, etc.), and one or more sound output devices (e.g., speakers, acoustic transducers, etc.). In some embodiments, the audio system includes a single sound capture device (e.g., a mono worldfacing microphone). In some embodiments, the audio system includes an array of multiple microphones. The multiple microphones or sound capture devices can be positioned in different spatial locations so that the multiple microphones obtain environmental audio at different spatial locations in the environment.

The processing circuitry is configured to obtain the audio data from the one or more sound capture devices and use the audio data obtained from the sound capture devices to determine, estimate, calculate, etc., various environmental conditions or environmental audio conditions. The environmental conditions can include an environmental or background noise level (e.g., in decibels), an arrival direction of directional environment/background sounds, an amplitude of environmental sound in different frequency ranges or frequency bands, etc. The processing circuitry may be configured to perform different analysis based on or using the audio data to determine any of the environmental conditions. For example, the processing circuitry can use the audio data obtained from the sound capture devices to determine the background or environmental sound level. In some embodiments the processing circuitry is configured to use the audio data from multiple audio capture devices to determine the arrival direction of the directional environment/background sounds. For example, the processing circuitry may compare an amplitude of the directional environment/background noise obtained at a first one of the sound capture devices to an amplitude of the directional environment/background noise obtained at a second one of the sound capture devices to determine the arrival direction of the environment/background noise.

In some embodiments, the processing circuitry is configured to use the one or more various environmental conditions or environmental audio conditions to determine one or more adjustment(s) for audio output. The processing circuitry can determine adjustment(s) for a spatializer, a speech synthesis model, an alert generator, etc., based on any of, or a combination of, the environmental conditions. For example, the processing circuitry may determine adjustments to one or more speech or sound presentation parameters of the speech synthesis model based on any of, or a combination of, the environmental audio conditions such as the background/environmental noise level. In some embodiments, the processing circuitry is configured to select or adjust a delivery mode of the speech synthesis model. For example, the speech synthesis model can be configured to operate according to a first or "soft" mode (with a corresponding set of speech presentation parameters so that audio output is perceived by the user as a quiet/soft voice), a normal, second, or moderate mode (with a corresponding set of speech presentation parameters so that audio output is perceived by the user as a normal conversational voice), or a third, shouting, or high mode (with a corresponding set of speech presentation parameters so that audio output is perceived by the user as a shouted voice). In some embodiments, the speech synthesis model is transitionable between these modes based on the environmental/background noise level. For example, if the environmental/background noise level exceeds a first threshold, the processing circuitry may transition the speech synthesis model from the first mode to the second mode to improve perceptibility of the audio output. Likewise, if the environmental/background noise level exceeds a second threshold (e.g., if the environmental/background noise level increases past the second threshold), the processing circuitry may transition the speech synthesis model from the second mode to the third mode to improve perceptibility of the audio output. In other embodiments, the speech presentation parameters of the speech synthesis model are updated or adjusted continuously in real-time. In some embodiments, the "style" or "mode" used by the speech synthesis model is used to generate a specific tonal variant of desired speech.

In some embodiments, the processing circuitry is configured to determine a virtual location for the spatializer that results in the user perceiving the audio output originating from or arriving from a direction without directional environmental/background noises. For example, if the processing circuitry determines that there is a loud environmental/background noise arriving at the user's right, the processing circuitry may determine that the virtual location should be shifted or adjusted so that the audio output of the sound output devices is perceived by the user as originating or arriving from the user's left. Advantageously, shifting or adjusting the virtual location can facilitate improved perceptibility of the audio output and reduce interference between the audio output and the directional environmental/background noise.

In some embodiments, the processing circuitry is configured to operate the sound output devices to provide an alert, notification, alarm, etc., that the virtual location used by the spatializer has changed. For example, the processing circuitry can operate the sound output device to provide the notification or alert to the user that the virtual location has been adjusted or changed. In some embodiments, a movement or adjustment of the virtual location from a first spatial position to another is immediately or perceptually animated.

In some embodiments, the processing circuitry is also configured to monitor the background/environmental noise level to determine if a modality in which information is provided to the user should be adjusted. For example, if the background/environmental noise level exceeds a threshold level, processing circuitry may determine that the modality should be shifted from an aural modality to a visual modality. In some embodiments, the processing circuitry may operate the display device to provide the information visually to the user.

Systems and Methods for Environment Based Audio Adjustment

System Overview

Referring particularly to FIG. 1, a system 100 for adjusting audio output of a speaker or a sound producing device is shown. System 100 can be configured to adjust the audio output (e.g., amplify, change a delivery style thereof, etc.) to facilitate improved perception or intelligibility of sound output or audio output by system 100. System 100 can be configured to monitor environmental audio or environmental audio conditions in real-time and adjust or change the audio output (e.g., modify) to account for the environmental audio or the environmental audio conditions so that system 100 can maintain perceptibility for a user.

System 100 can be configured as a system or a sub-system of a head worn display device such as a virtual reality (VR) device, a mixed reality (MR) device, or an augmented reality (AR) device. In some embodiments, the functionality of system 100 as described herein is distributed across multiple devices or multiple processing units or processors. For example, the functionality of system 100 may be performed by a personal computer device (e.g., a smartphone, a tablet, a portable processing device, etc.) in combination with wearable sound output devices (e.g., earbuds, headphones, etc.) and one or more microphones (e.g., a microphone of the personal computer device, a microphone of the wearable sound output devices, etc.).

System 100 includes a controller 102 (e.g., a processor, a processing circuit, processing circuitry, a computer, a computing device, etc.), one or more sound capture devices 104 (e.g., microphones, sound transducers, etc.), and one or more sound output devices 106 (e.g., speakers, sound transducers, etc.), according to some embodiments. System 100 may also include a display device 434 (e.g., a head worn display, a display screen, etc.) that is configured to provide visual imagery or display data (e.g., textual data) to a user. Controller 102 is configured to receive or obtain input audio from the sound capture devices 104 and can use the obtained input audio to determine one or more audio adjustments, sound adjustments, environmental audio properties, environmental audio conditions, etc., based on the input audio. Controller 102 is configured to operate the sound output device 106 based on or using the input audio to provide output audio (e.g., output sound, a sound output, etc.) to a user 114. Controller 102 can also operate display device 434 to provide visual imagery to user 114. For example, controller 102 may determine, based on the input audio, that a modality of information should be changed from an aural modality (e.g., a sound alert) to a visual modality (e.g., a textual alert) and may operate display device 434 to provide the information according to the visual modality (e.g., to display the textual alert).

Sound capture devices 104 may be positioned in an environment 120 and can be configured to obtain, record, monitor, etc., environmental audio in the environment 120. In some embodiments, sound capture devices 104 are configured to monitor environmental audio that is generated by an environmental audio source 124 and provide controller 102 with the input audio or input audio data that is generated based on the environmental audio produced by the environmental audio source 124. It should be understood that while FIG. 1 illustrates only one environmental audio source 124, any number of environmental audio sources 124 may be present in environment 120. Sound capture devices 104 can be positioned in spatially different locations, or may be positioned along a structural member of system 100. For example, if system 100 is configured as an augmented reality glasses system, sound capture devices 104 may be positioned along a temple arm of the glasses.

Controller 102 is configured to obtain or receive input audio from each of the sound capture devices 104a . . . 104n. For example, controller 102 may receive input audio data from sound capture device 104a separately from sound capture device 104b, separately from a sound capture device 104c, etc. Controller 102 is also configured to independently operate each of sound output devices 106a . . . 106n. For example, controller 102 can operate sound output devices 106 in unison to provide a standard sound output, or may operate sound output devices 106a . . . 106n differently to provide an immersive experience for the user to simulate directionality of sound output (e.g., in a virtual environment). In some embodiments, controller 102 is configured to operate a sound output device 106 for a user's right ear differently than a sound output device 106 for a user's left ear. In some embodiments, controller 102 is configured to operate sound output devices 106 differently to improve perceptibility of the output audio given current environmental audio or environmental audio conditions.

Figure 4:
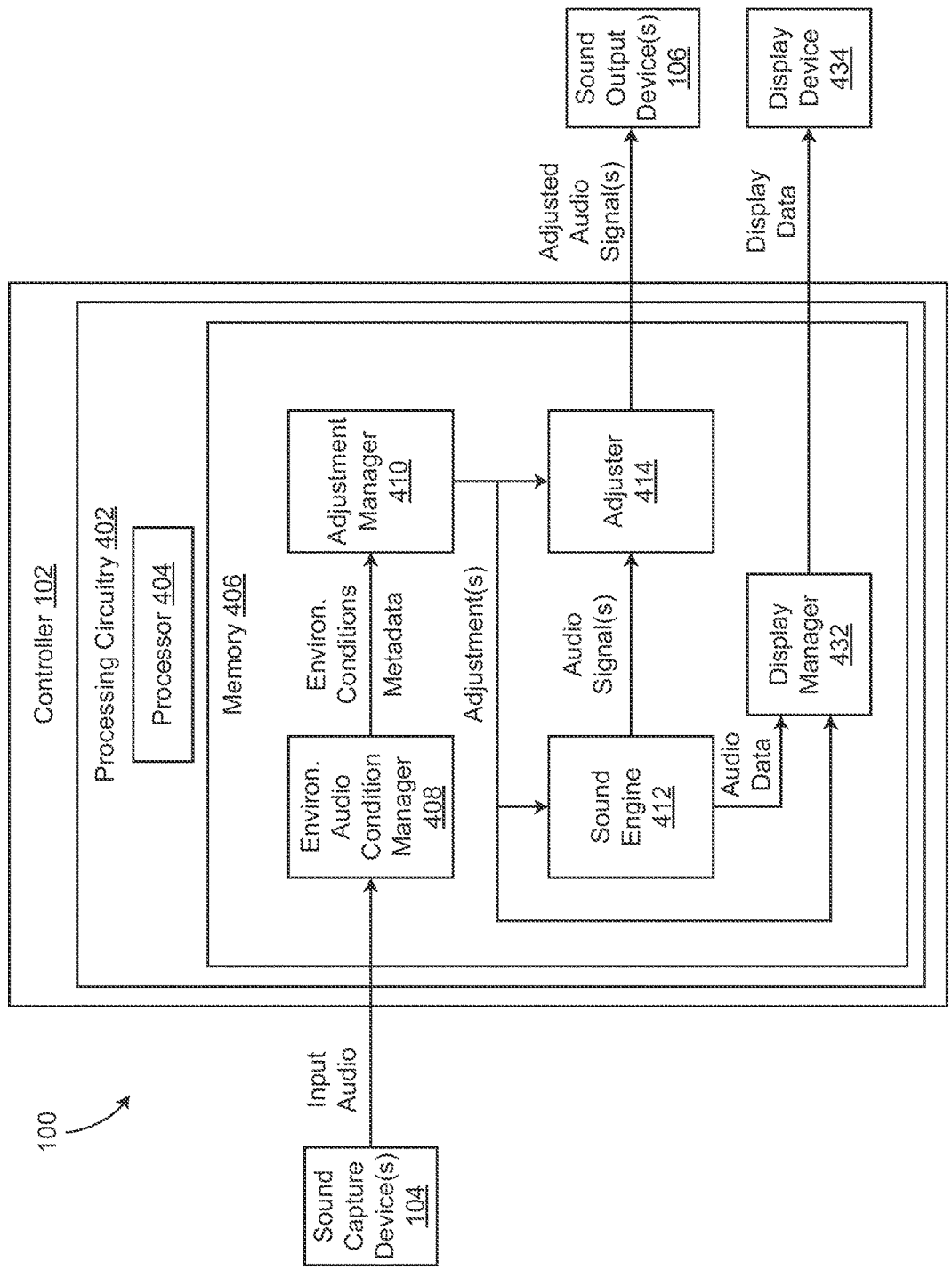
FIG. 4 is a block diagram of the system of FIG. 1 showing the controller in greater detail, according to some embodiments.

Referring particularly to FIG. 4, a portion of system 100 is shown in greater detail, according to some embodiments. Specifically, FIG. 4 shows controller 102 and the functionality of controller 102 in greater detail. Controller 102 can include a communications interface that facilitates communications (e.g., the transfer of data) into and out of the controller 102. For example, the communications interface may facilitate communication (e.g., wireless communication) between sound capture device(s) 104, sound output device(s) 106, and display device 434. The communications interface can be or include wired or wireless communications interfaces (e.g., jacks, antennas, transmitters, receivers, transceivers, wire terminals, etc.) for conducting data communications between the controller 102 and external systems, sensors, devices, etc. In various embodiments, communications via the communications interface can be direct (e.g., local wired or wireless communications such as Bluetooth) or via a communications network (e.g., a WAN, the Internet, a cellular network, etc.). For example, the communications interface can include an Ethernet card and port for sending and receiving data via an Ethernet-based communications link or network. In another example, the communications interface can include a Wi-Fi transceiver for communicating via a wireless communications network. In another example, the communications interface can include cellular or mobile phone communications transceivers. In some embodiments, the communications interface is or includes an Ethernet interface or a USB interface.

Still referring to FIG. 4, the controller 102 is shown to include a processing circuitry 402 including a processor 404 and memory 406. The processing circuitry 402 can be communicably connected to the communications interface such that the processing circuitry 402 and the various components thereof can send and receive data via the communications interface. The processor 404 can be implemented as a general purpose processor, an application specific integrated circuit (ASIC), one or more field programmable gate arrays (FPGAs), a group of processing components, or other suitable electronic processing components.

The memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 406 can be or include volatile memory or non-volatile memory. The memory 406 can include database components, object code components, script components, or any other type of information structure for supporting the various activities and information structures described in the present application. According to some embodiments, the memory 406 is communicably connected to the processor 404 via the processing circuitry 402 and includes computer code for executing (e.g., by the processing circuitry 402 and/or the processor 404) one or more processes described herein.

It should be understood that any of the functionality of controller 102 or processing circuitry 402 can be performed locally (e.g., locally at system 100) or may be performed remotely. In some embodiments, for example, controller 102 is configured to provide input audio data to a remote processing circuit, remote processing circuitry, etc. In some embodiments, some of the functionality of processing circuitry 402 as described herein is performed locally by controller 102 while other portions of the functionality of processing circuitry 402 are performed by remote processing circuitry.

Referring still to FIG. 4, memory 406 is shown to include an environmental audio condition manager 408, an adjustment manager 410, a sound engine 412, an adjuster 414, and a display manager 432, according to some embodiments. Environmental audio condition manager 408 is configured to receive the input audio from each of the sound capture device(s) 104 and use the input audio to identify, determine, analyze, etc., environmental conditions, parameters, properties of the environmental audio, metadata, etc. In some embodiments, environmental audio condition manager 408 is configured to provide the environmental conditions or the metadata that are determined based on the input audio. Adjustment manager 410 is configured to use the environmental conditions or the metadata to determine or calculate one or more adjustments for sound output devices 106 or that can be used to adjust an operation of sound output devices 106.

Adjustment manager 410 is configured to provide any of the adjustment(s) to sound engine 412, adjuster 414, or display manager 432. Sound engine 412 may be configured to generate, produce, output, etc., audio signal(s) for sound output device(s). In some embodiments, sound engine 412 is configured to receive the adjustment(s) and use the adjustments to change generation of the audio signal(s) for sound output device(s) 106. In some embodiments, adjuster 414 is configured to use the adjustment(s) to change the audio signal(s) after generation by sound engine 412. For example, adjuster 414 may receive the audio signal(s) from sound engine 412 and use the adjustment(s) received from adjustment manager 410 to output adjusted audio signal(s). In some embodiments, the adjustment(s) are provided to both sound engine 412 and adjuster 414 and both sound engine 412 and adjuster 414 are configured to cooperatively output the adjusted audio signal(s).

Sound output device(s) 106 can receive the adjusted audio signal(s) from processing circuitry 402 and operate to provide the output audio to user 114 based on the adjusted audio signal(s). In some embodiments, the adjusted audio signal(s) include different audio signal(s) for different ones of sound output device(s) 106. For example, a first sound output device 106a may receive adjusted audio signal(s) that are different than the adjusted audio signal(s) that are provided to a second sound output device 106b.

In some embodiments, the adjustment(s) include a change in modality for information or alerts. Display manager 432 may receive the adjustment(s) indicating that a particular alert, sound, etc., should be provided as graphical or visual data instead of as an aural alert. In some embodiments, display manager 432 also receives audio data from sound engine 412 to display as visual data. Display manager 432 may operate to provide the audio data (e.g., a notification, an alert, information, etc.) as visual information via display device 434. Specifically, display manager 432 may receive the audio data from sound engine 412 and, in response to receiving a command from adjustment manager 410, operate display device 434 to provide the audio data as visual data. In some embodiments, display manager 432 and display device 434 are optional. For example, system 100 may be an audio-only system that does not include a display device, a display screen, etc.

Environmental Audio Conditions

Figure 5:
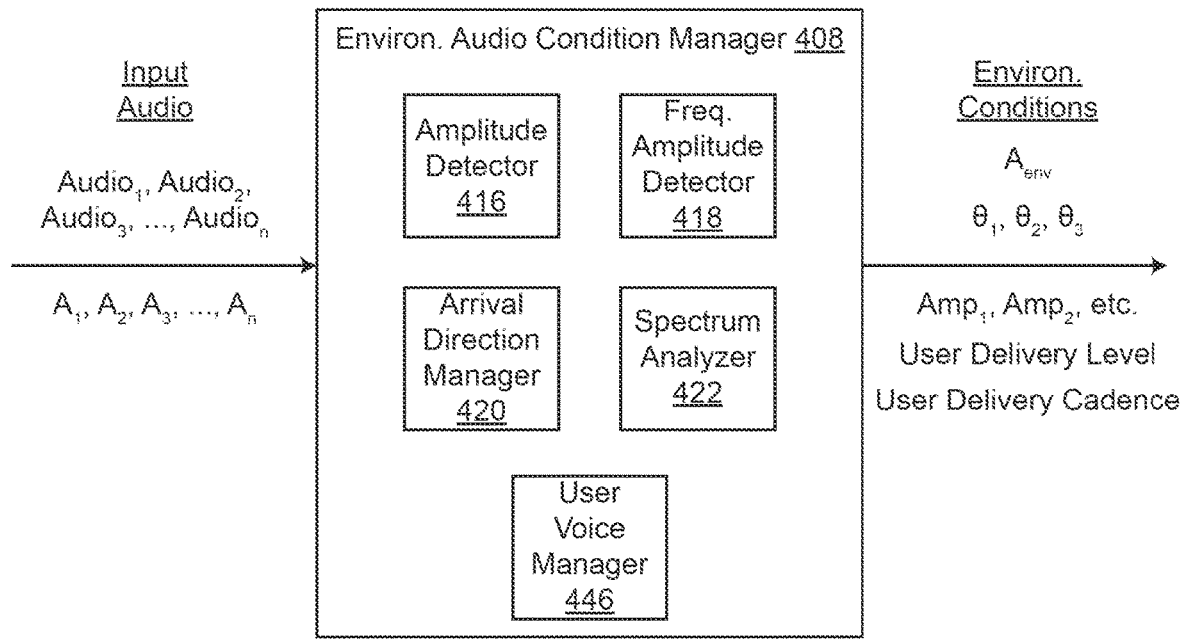
FIG. 5 is a block diagram showing an environmental audio condition manager of the controller of FIG. 4 in greater detail, according to some embodiments.

Referring to FIG. 5, environmental audio condition manager 408 is shown in greater detail, according to some embodiments. Environmental audio condition manager 408 includes an amplitude detector 416, a frequency amplitude detector 418, an arrival direction manager 420, and a spectrum analyzer 422. Environmental audio condition manager 408 is configured to receive the input audio from each of the sound capture device(s) 104, shown as $Audio_1$, $Audio_2$, $Audio_3$, ..., and $Audio_n$. Specifically, $Audio_1$ may be any audio data or audio signals received from sound capture device 104a, $Audio_2$ may be any audio data or audio signals received from sound capture device 104b, $Audio_3$ may be any audio data or audio signals received from sound capture device 104c, etc. In some embodiments, each sound capture device 104 is configured to provide an amplitude A of environmental audio to environmental audio condition manager 408. For example, sound capture device 104a may provide environmental audio condition manager 408 an amplitude $A_1$, sound capture device 104b may provide environmental audio condition manager 408 an amplitude $A_2$, etc., and sound capture device 104n may provide an amplitude $A_n$. In some embodiments, the amplitudes $A_1, A_2, \ldots, A_n$ are provided in real-time to environmental audio condition manager 408. In some embodiments, the amplitudes $A_1, A_2, \ldots, A_n$ are provided to environmental audio condition manager 408 as time-series data.

Amplitude detector 416 is configured to use the input audio (e.g., $Audio_1$, $Audio_2$, ..., $Audio_n$) to identify an amplitude or a sound level of environmental audio. For example, amplitude detector 416 can detect a background noise level, or an amplitude or the environmental audio. The background noise level may be referred to as $A_{env}$. In some embodiments, the background noise level $A_{env}$ is a maximum detected amplitude of the input audio over a time period. In some embodiments, the background noise level $A_{env}$ is a maximum detected amplitude of environmental audio across one or more frequency ranges. In some embodiments, the background noise level $A_{env}$ is an average of the amplitudes $A_1, A_2, A_3, \ldots, A_n$. In some embodiments, the background noise level $A_{env}$ is an average background noise level as averaged across multiple samples of the input audio, or across a time duration. The background noise level $A_{env}$ can be output by environmental audio condition manager 408 for use in determining the adjustment(s). In some embodiments, the background noise level $A_{env}$ is used by any of frequency amplitude detector 418, arrival direction manager 420, or spectrum analyzer 422 to perform any of their respective functionalities. The background noise level $A_{env}$ may be a decibel sound pressure (dB SPL) level.

Frequency amplitude detector 418 is configured to use the input audio to identify an amplitude of environmental audio across one or more particular frequency ranges. For example, frequency amplitude detector 418 may analyze the input audio across speech-sensitive frequency bands (e.g., 300 to 3000 Hz) to determine an amplitude of the environmental/input audio across the speech-sensitive frequency bands. In some embodiments, frequency amplitude detector 418 analyzes the input audio across multiple frequency bands. In some embodiments, frequency amplitude detector 418 is configured to analyze the input audio (e.g., the audio data obtained by the sound capture device(s) 104) across a frequency band corresponding to sound output by sound output device(s) 106. For example, if sound output device(s) 106 output speech audio, frequency amplitude detector 418 can analyze the input/environmental audio across speech sensitive bands. Likewise, if sound output device(s) 106 operate to provide or output audio or sound having a frequency f, frequency amplitude detector 418 may be configured to analyze the input/environmental audio data obtained from sound capture device(s) 104 across a frequency range $freq_1$ to determine an amplitude $Amp_1$ of the input/environmental audio across the frequency range $freq_1$. Frequency amplitude detector 418 can be configured to analyze the input/environmental audio data cross any n number of frequency ranges $freq_1, freq_2, freq_3, \ldots, freq_n$, to determine or estimate an amplitude of the input/environmental audio $Amp_1, Amp_2, Amp_3, \ldots, Amp_n$ of each frequency range. In some embodiments, the frequency ranges $freq_1, freq_2, freq_3, \ldots, freq_n$, are frequency ranges that are relevant to an intelligibility or perceptibility of the sound output by the sound output device(s) 106. Environmental audio condition manager 408 may provide any of the amplitudes $Amp_1$, $Amp_2$, $Amp_3$, . . . , $Amp_n$ of each frequency range to adjustment manager 410 for use in determining the adjustment(s).

Referring still to FIG. 5, spectrum analyzer 422 may be configured to use the input audio to perform audio spectrum analysis techniques to determine if environmental or background noises (as monitored by sound capture device(s) 104) may interfere with or reduce a perceptibility of sound or audio output by sound output device(s) 106. For example, if the background or environmental noises are directional, spectrum analyzer 422 may be configured to analyze the environmental/input audio to determine if the directional noises interfere with or reduce a perceptibility of the sound or audio output by sound output device(s) 106.

Figure 2:
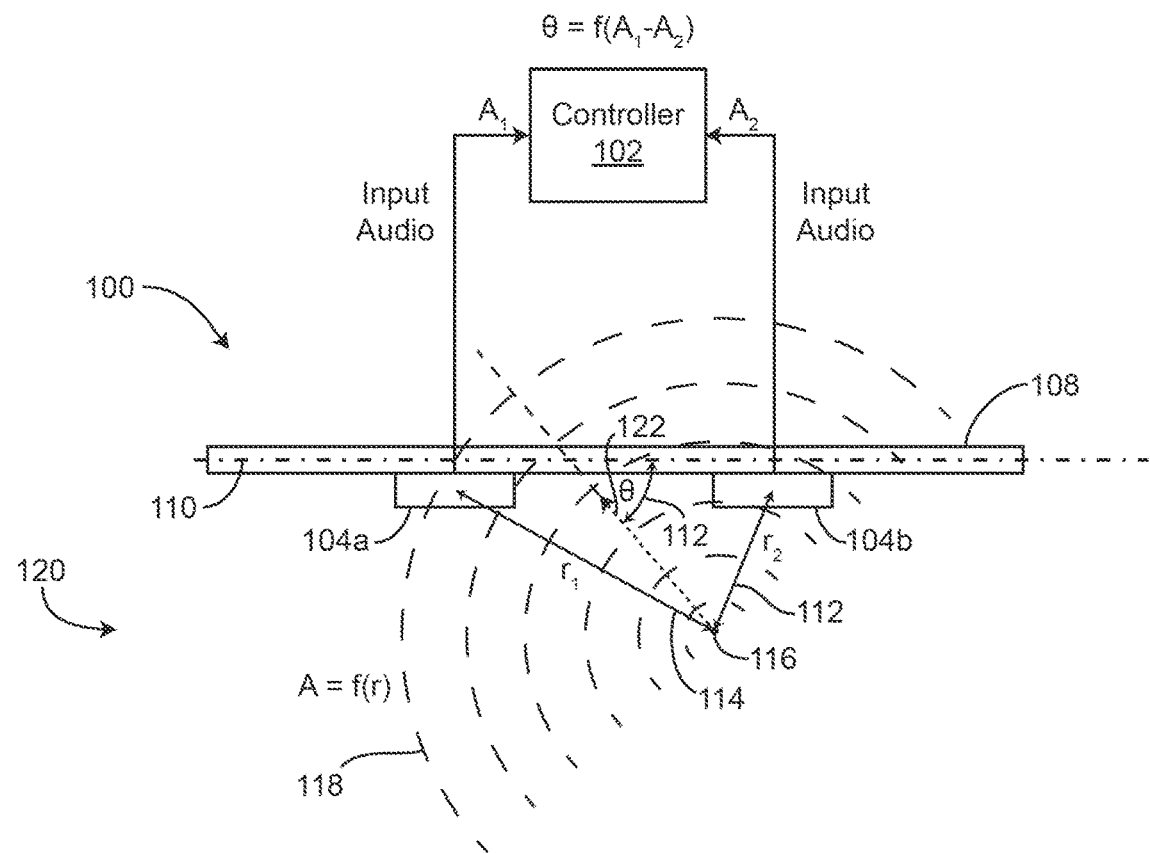
FIG. 2 is a block diagram of the system of FIG. 1 including a first microphone, a second microphone, and a controller configured to use amplitude of audio at the first and the second microphone to determine an arrival direction of environmental noises, according to some embodiments.

Referring particularly to FIGS. 2 and 5, arrival direction manager 420 may be configured to determine, calculate, estimate, etc., an arrival direction of background or environmental noise relative to system 100. In some embodiments, system 100 includes two or more sound capture devices 104 so that arrival direction manager 420 can identify an arrival direction of background noise or environmental noise. It should be understood that while FIG. 2 shows a diagram including only a single environmental/background noise that is directional, arrival direction manager 420 can be configured to perform similar functionality to determine an arrival direction of each of multiple environmental/background noises.

As shown in FIG. 2, system 100 may include a structural member 108 that defines an axis 110. Axis 110 may extend longitudinally, laterally, or between longitudinally and laterally through structural member 108. While FIG. 2 shows axis 110 extending through an elongated structural member 108, structural member 108 may have any form. For example, system 100 can include multiple structural members 108 which each include one or more sound capture devices 104. As shown in FIG. 2, structural member 108 is an elongated member such as a temple arm of an augmented, virtual, or mixed reality headset. However, it should be understood that structural member 108 can be any single or collection of structural members (e.g., housings, rigid members, flexible members, etc.) that facilitate positioning sound capture devices 104 in different spatial locations.

System 100 can include a first sound capture device 104a and a second sound capture device 104b positioned along structural member 108 at different spatial locations. For example, first sound capture device 104a and second sound capture device 104b may be positioned in different spatial locations along a single axis (e.g., along axis 110) as shown in FIG. 2 or may be offset from each other along multiple axes.

First sound capture device 104a and second sound capture device 104b are configured to monitor, detect, determine, or otherwise measure an amplitude of environmental audio, background noises, directional sounds, etc., of environment 120. As shown in FIG. 2, an environmental sound 118 originates at location 116 and propagates soundwaves towards system 100. First sound capture device 104a and second sound capture device 104b can be at least partially positioned in environment 120 so that first sound capture device 104a and second sound capture device 104b can obtain or measure an amplitude of environmental sound 118 at different spatial locations in environment 120.

As shown in FIG. 2, environmental sound 118 may have an amplitude A that decreases with increased distance from location 116. Specifically, environmental sound 118 can have an amplitude A that is a function of a radial distance r from location 116 such that A=f(r) where increased values of r correspond to or result in decreased values of A. As shown in FIG. 2, environmental sound 118 propagates in direction 122 towards system 100. Due to the spatial position of location 116 relative to system 100, first sound capture device 104a may be a distance $r_1$ from location 116 and second sound capture device 104b may be a distance $r_2$ from location 116. In some embodiments, depending on a relative distance or position between location 116 and system 100, $r_1$ and $r_2$ may be different. For example, $r_1$ may be greater than $r_2$ (as shown in FIG. 2), equal to each other, or $r_2$ may be greater than $r_1$.

In some embodiments, first sound capture device 104a may detect a first amplitude $A_1$ that indicates the distance $r_1$ between first sound capture device 104a and location 116. Likewise, second sound capture device 104b may detect a second amplitude $A_2$ that indicates the distance $r_2$ between second sound capture device 104b and location 116. In some embodiments, first sound capture device 104a and second sound capture device 104b are configured to provide the amplitudes $A_1$ and $A_2$ to controller 102 for use in calculating an arrival direction θ of environmental sound 118 relative to system 100, shown as angle 112. In some embodiments, first sound capture device 104a and second sound capture device 104b are configured to provide corresponding input audio to controller 102 for use in determining the amplitudes $A_1$ and $A_2$. For example, first sound capture device 104a and second sound capture device 104b can be configured to provide controller 102 (or more specifically, environmental audio condition manager 408) with the corresponding input audio from each sound capture device 104. In some embodiments, environmental audio condition manager 408 (or more specifically, amplitude detector 416) is configured to analyze the input audio data or input audio signals obtained from first sound capture device 104a and second sound capture device 104b to determine or estimate the amplitudes $A_1$ and $A_2$. In some embodiments, the amplitudes $A_1$ and $A_2$ as measured or detected by first sound capture device 104a and second sound capture device 104b are directly proportional to a distance between first sound capture device 104a and location 116 and second sound capture device 104b and location 116 (e.g., $A_1$=f($r_1$) and $A_2$=f($r_2$)).

In some embodiments, arrival direction manager 420 is configured to use the amplitudes $A_1$ and $A_2$ to estimate, calculate, or otherwise determine the arrival direction θ of environmental sound 118. In some embodiments, arrival direction manager 420 is configured to determine a difference ΔA between the amplitudes $A_1$ and $A_2$ and use the difference ΔA to estimate the arrival direction θ as shown in the Equation below:

$$\theta = f(\Delta A)$$

where θ is the arrival direction, ΔA is a difference or comparison between the amplitudes $A_1$ and $A_2$ (e.g., ΔA=$A_1$−$A_2$), and f is a function that relates θ to ΔA. For example, arrival direction manager 420 may first determine the difference ΔA based on the amplitudes $A_1$ and $A_2$ and then use the difference ΔA to estimate the arrival direction θ. Arrival direction manager 420 uses the amplitudes $A_1$ and $A_2$ directly to calculate or estimate the arrival direction θ as shown in the Equations below:

$$\theta = f(A_1, A_2)$$

or:

$$\theta = f(A_1 - A_2)$$

according to some embodiments.

Figure 3:
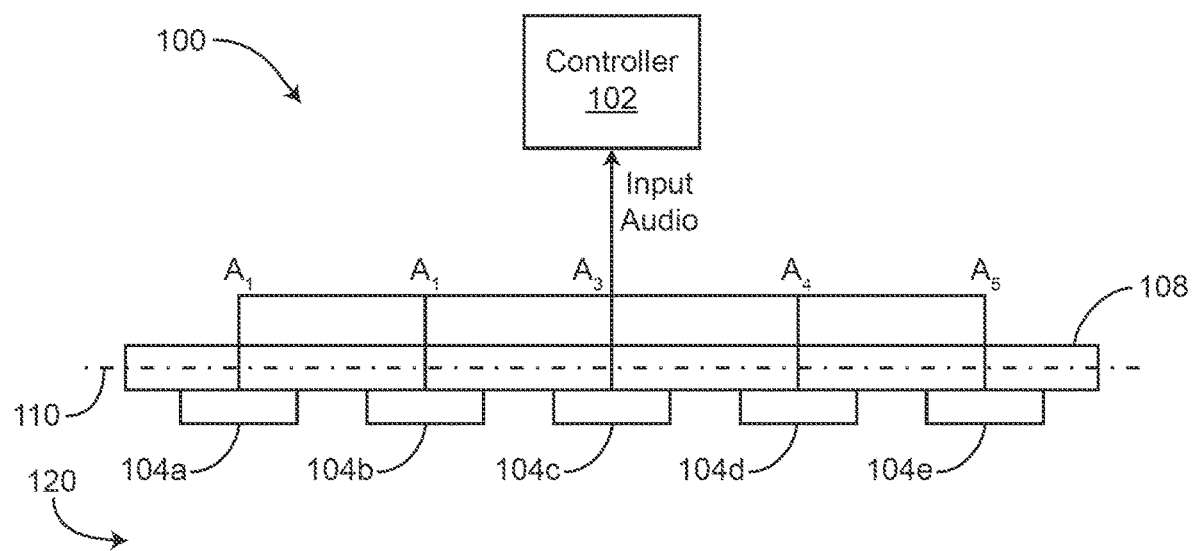
FIG. 3 is a block diagram of the system of FIG. 1 including an array of microphones, according to some embodiments.

Referring particularly to FIG. 3, system 100 can include an array of sound capture devices 104 positioned along structural member 108 or along multiple structural members 108. For example, system 100 can include a first sound capture device 104a, a second sound capture device 104b, a third sound capture device 104c, a fourth sound capture device 104d, and a fifth sound capture device 104e. Each of sound capture devices 104a-104e may be at least partially positioned in environment 120 so that they can measure, detect, monitor, sense, etc., environmental or background noises. Each of sound capture devices 104a-104e can be configured to provide a corresponding amplitude A (e.g., $A_1$, $A_2$, $A_3$, $A_4$, and $A_5$) or input audio data to controller 102. In some embodiments, sound capture devices 104 are spatially spaced (e.g., uniformly or non-uniformly) along axis 110, or along multiple axes. For example, sound capture devices 104 can be positioned at different spatial locations so that sound capture devices 104 can obtain input audio data or detect amplitudes of environmental or background noise at different spatial locations in environment 120. Advantageously, using more than two sound capture devices 104 can facilitate improved accuracy in estimation or calculation of the arrival direction θ.

It should be understood that while FIG. 2 shows a two-dimensional representation of an arrival direction of an environmental or background noise, any of the functionality described herein with reference to FIGS. 2 and 5 may be performed for three-dimensional arrival of environmental or background noise. For example, sound capture devices 104 may be spatially positioned along several axes so that controller 102, or more particularly, environmental audio condition manager 408 can estimate multiple angular values of the arrival direction (e.g., $\theta_1$, $\theta_2$, and $\theta_3$) about different axes. In this way, system 100 can estimate and account for directional environmental/background noises that arrive at system 100 about different axes (e.g., in a three-dimensional direction).

Referring particularly to FIG. 5, environmental audio condition manager 408 can also include a user voice manager 446. In some embodiments, user voice manager 446 is a vocoder that is configured to convert audio data of spoken words, phrases, sentences, etc., to textual data or textual information for use in system 100. In some embodiments, user voice manager 446 is the same as or similar to speech synthesis model 438 as described in greater detail below with reference to FIG. 7. In some embodiments, user voice manager 446 is configured to user the input audio or input audio data obtained from sound capture device(s) 104 to determine if the user has provided a spoken user request. In some embodiments, user voice manager 446 is configured to monitor spoken words or phrases that are pronounced by user 114 and are obtained or input through the input audio data. In some embodiments, user voice manager 446 is configured to generate and store a profile, a model, etc., of the user's voice. User voice manager 446 may use a neural network to generate the profile, model, etc., of the user's voice. User voice manager 446 can monitor the user's speech delivery level (e.g., amplitude, loudness, volume, etc., in dB SPL) and approximate a match in delivery (e.g., through a gain and/or voice template or model). For example, user voice manager 446 can measure the user's cadence and approximate a match in delivery speed of the spoken inputs provided by the user. In some embodiments, the user voice manager 446 is configured to output the user delivery level (e.g., whether the user is shouting, whispering, speaking normally, etc.) and the user delivery cadence (e.g., a rate at which the user is speaking) to adjustment manager 410 as part of the environmental conditions.

Figure 6:
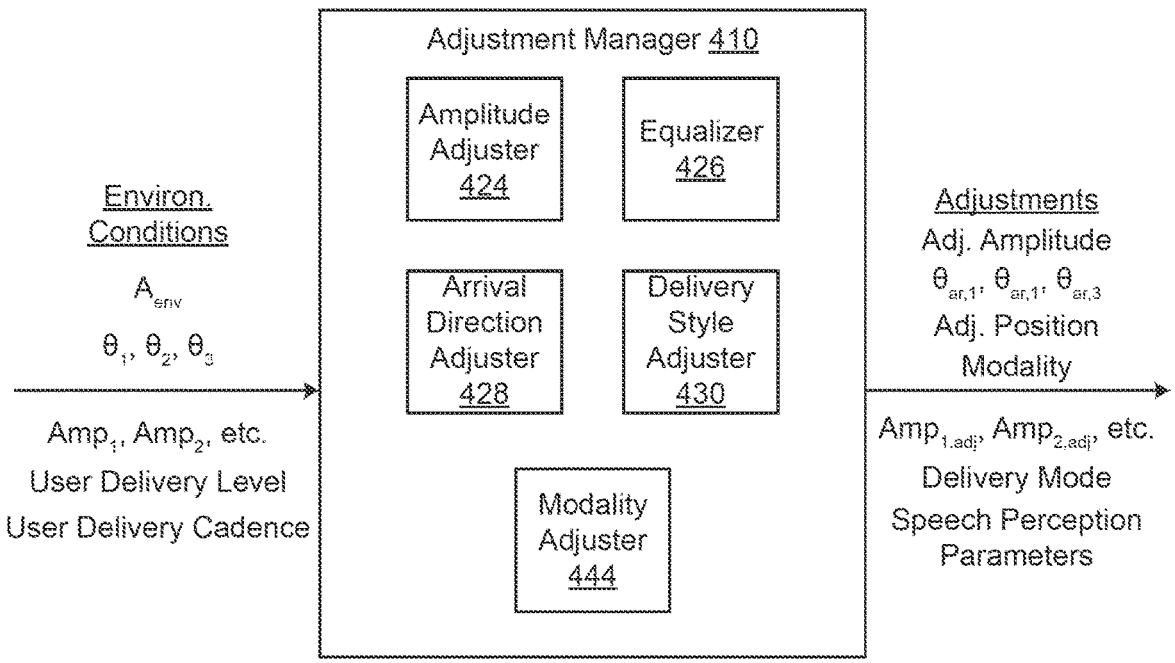
FIG. 6 is a block diagram showing an adjustment manager of the controller of FIG. 4 in greater detail, according to some embodiments.

Referring particularly to FIG. 6, adjustment manager 410 is shown in greater detail, according to some embodiments. Adjustment manager 410 is configured to receive any of the environmental conditions as identified by environmental audio condition manager 408 and use the environmental conditions to determine one or more adjustments. Adjustment manager 410 can include an amplitude adjuster 424, an equalizer 426 (e.g., a frequency-dependent filter, a frequency-dependent amplitude adjuster, a frequency amplitude adjuster, etc.), an arrival direction adjuster 428, a delivery style adjuster 430, and a modality adjuster 444. In some embodiments, adjustment manager 410 is configured to provide any of the adjustments to sound engine 412, adjuster 414, or display manager 432. Sound engine 412, adjuster 414, and display manager 432 can use the adjustment(s) as described herein to adjust an operation of sound output device(s) 106 to improve or increase a perceptibility of sound output by sound output device(s) 106. Adjustment manager 410 can use any of the environmental conditions or any combination of the environmental conditions to determine various adjustment(s) (e.g., adjustments to delivery style of a speech synthesizer, adjustments to amplitude or sound level of sound output device(s) 106, etc.). For example, adjustment manager 410 can use any of the background/environmental sound level $A_{env}$, the arrival direction θ of a direction background/environmental noise, amplitudes of environmental noise in various frequency bands, outputs of spectrum analyzer 422, user delivery level, or user delivery cadence, or any combination thereof to determine the adjustments.

Amplitude adjuster 424 can be configured determine an adjustment (e.g., an increase) for sound output device(s) 106 to increase an amplitude of sound output by sound output device(s) 106. In some embodiments, amplitude adjuster 424 is configured to use the environmental or background sound level $A_{env}$ to determine an adjusted amplitude for sound output device(s) 106. In some embodiments, amplitude adjuster 424 is configured to compare the background sound level $A_{env}$ to one or more threshold amplitude levels (e.g., $A_{thresh,1}$, $A_{thresh,2}$, $A_{thresh,3}$, etc.) to determine an amount to increase or decrease the amplitude of the sound output by sound output device(s). For example, amplitude adjuster 424 may compare the background sound level $A_{env}$ to the first threshold $A_{thresh,1}$ and the second threshold $A_{thresh,2}$ and if the background sound level $A_{env}$ is between the first threshold $A_{thresh,1}$ and the second threshold $A_{thresh,2}$, amplitude adjuster 424 can determine an increase $\Delta A_1$ for the sound output device(s) 106. In some embodiments, the increase $\Delta A_1$ is an amount that sound waves or audio signal(s) should be amplified to compensate for current or noisy background/environmental conditions. Likewise, amplitude adjuster 424 can compare the background sound level $A_{env}$ to the second threshold $A_{thresh,2}$ and the third threshold $A_{thresh,3}$ and if the background sound level $A_{env}$ is between the second threshold $A_{threshold,2}$ and the third threshold $A_{threshold,3}$, amplitude adjuster 424 can determine an increase $\Delta A_2$ for the sound output device(s) 106.

Generally, amplitude adjuster 424 can compare the background noise level $A_{env}$ to any n number of thresholds or ranges:

| If: | Then: |
|---|---|
| $A_{threshold,1} \leq A_{env} \leq A_{threshold,2}$ | $\Delta A_1$ |
| $A_{threshold,2} \leq A_{env} \leq A_{threshold,3}$ | $\Delta A_2$ |
| ... | ... |
| $A_{threshold,n} \leq A_{env} \leq A_{threshold,(n+1)}$ | $\Delta A_n$ | to determine an amount $\Delta A_n$ by which sound output by sound output device(s) 106 should be amplified, according to some embodiments.

In some embodiments, amplitude adjuster 424 uses discrete ranges as described in greater detail above to determine amplification adjustments for sound output device(s) 106. Amplitude adjuster 424 uses a continuous function, relationship, equation, etc., to determine the amount $\Delta A$ by which sound output by sound output device(s) 106 should be amplified:

$$\Delta A = f(A_{new})$$

where $\Delta A$ is the amount by which sound output should be amplified, $A_{env}$ is the background or environmental noise level, and f is a continuous function that relates $A_{env}$ to $\Delta A$.

Referring still to FIG. 6, equalizer 426 can be configured to determine amplifications for sound output by sound output device(s) 106 for specific frequency ranges. In some embodiments, equalizer 426 is configured to receive the amplitudes $Amp_1$, $Amp_2$, etc., as determined by frequency amplitude detector 418 and use the amplitudes $Amp_1$, $Amp_2$, etc., to determine amplifications for sound output by sound output device(s) 106 at different frequency ranges $freq_1$, $freq_2$, $freq_3$, etc. In some embodiments, equalizer 426 is configured to use similar functionality as amplitude adjuster 424 to determine adjustments or amplifications $\Delta Amp_1$, $\Delta Amp_2$, $\Delta Amp_3$, etc., for sound output device(s) 106 for the frequency ranges $freq_1$, $freq_2$, $freq_3$, etc. In this way, equalizer 426 can be configured to increase, decrease, or otherwise adjust (e.g., amplify) sound output by sound output device(s) 106 across various frequency ranges.

Figure 8:
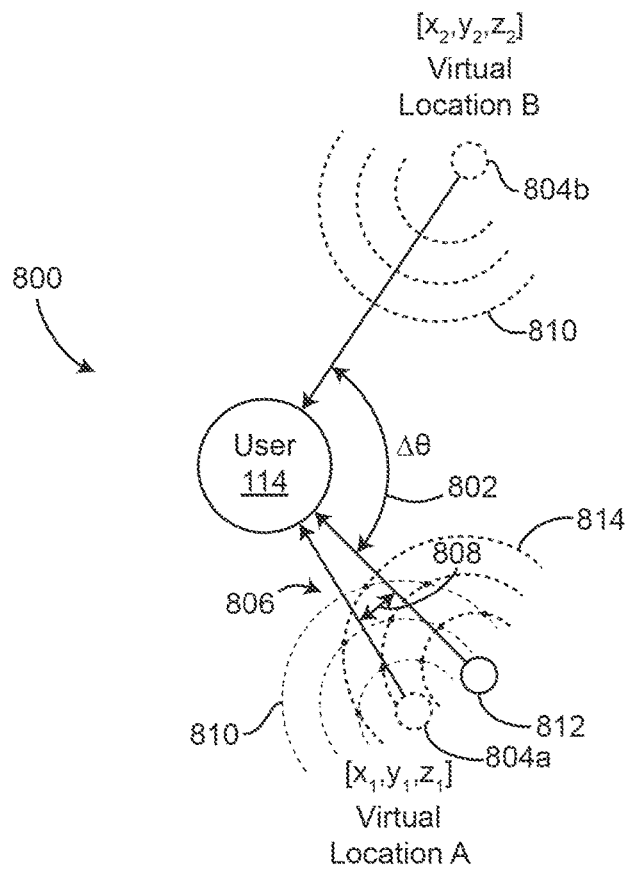
FIG. 8 is a diagram showing adjustment of a virtual location to maintain separation between an environmental noise source and a sound produced by a sound output device of the system of FIG. 1, according to some embodiments.

Referring particularly to FIGS. 6 and 8, arrival direction adjuster 428 can be configured to determine an adjusted arrival direction for sound provided, produced, or output by sound output device(s) 106. In some embodiments, arrival direction adjuster 428 is configured to receive the arrival direction θ as determined by arrival direction manager 420 using any of the techniques described in greater detail above with reference to FIGS. 2 and 5.

Arrival direction adjuster 428 can use the arrival direction θ (or $\theta_1$, $\theta_2$, and $\propto_3$) to determine an arrival direction for sound output by sound output device(s) 106 so that the environmental or background noise does not interfere with sound output by sound output device(s) 106, or to reduce an amount of interference between the environmental/background noise and the sound output by sound output device(s) 106. In some embodiments, arrival direction adjuster 428 is configured to determine an arrival direction $\theta_{ar}$ for the sound output by sound output device(s) 106 that is offset from the arrival direction θ of the background/environmental noise. For example, arrival direction adjuster 428 can be configured to determine arrival direction $\theta_{ar}$ for the sound output by sound output device(s) 106 to maintain a 10 to 30 degree separation between the background/environmental noise and the sound output by sound output device(s) 106. It should be understood that while arrival direction adjuster 428 is described herein as determining an arrival direction for the sound output by sound output device(s) 106 about one axis (e.g., in a two-dimensional plane), arrival direction adjuster 428 can perform similar functionality or techniques to determine an arrival direction in multiple directions or about multiple axes (e.g., $\theta_{ar,1}$, $\theta_{ar,2}$, and $\theta_{ar,3}$) for a three-dimensional coordinate system.

As shown in FIG. 8, a sound 810 that is output by sound output device(s) 106 may be provided to user 114 from a first virtual location 804a. In some embodiments, first virtual location 804a is a location that is used by a simulation or a spatializer to generate audio signals for sound output device(s) 106 so that the user 114 perceives the sound 810 originating from a virtual location. As shown in FIG. 8, user 114 also receives or can hear a directional sound 814 that originates from the environment. Directional sound 814 originates from location 812. As shown in FIG. 8, sound 810 originates from first virtual location 804a and may interfere with directional sound 814 at this location (shown by interference 806). In some embodiments, directional sound 814 may interfere with sound 810 due to an angular separation 808 between sound 810 and directional sound 814 being below a threshold amount. For example, if first virtual location 804a is proximate or adjacent location 812, directional sound 814 and sound 810 may interfere, which may reduce a perceptibility of sound 810 by user 114.

In some embodiments, first virtual location 804a has a three-dimensional position $[x_1\ y_1\ z_1]$. For purposes of illustration, diagram 800 shows a two-dimensional representation and as such, for purposes of illustration, first virtual location 804a may have a two-dimensional position $[x_1\ y_1]$. In order to reduce or mitigate perceptibility decreases that may occur due to interference between sound 810 and directional sound 814, arrival direction adjuster 428 may determine a second virtual location 804b that achieves or results in a sufficient angular offset between the arrival of sound 810 and directional sound 814. Second virtual location 804b may have a three-dimensional position $[x_2\ y_2\ z_2]$ or a two-dimensional position $[x_2\ y_2]$. In some embodiments, arrival direction adjuster 428 is configured to use the arrival direction of directional sound 814 as determined by arrival direction manager 420 to determine second virtual location 804b (e.g., to determine the coordinates $[x_2\ y_2\ z_2]$ or $[x_2\ y_2]$ of second virtual location 804b) that maintains an offset 802 (e.g., an arrival direction offset $\Delta\theta$) of 10 to 30 degrees between an arrival direction of sound 810 originating from second virtual location 804b and directional sound 814 originating from location 812.

Advantageously, determining the second virtual location 804b to maintain an arrival direction offset $\Delta\theta$ that is at least 10-30 degrees may facilitate improved perception of sound 810 by user 114. In some embodiments, arrival direction adjuster 428 is configured to determine an arrival direction of sound 810 that maintains the arrival direction offset $\Delta\theta$ that is at least 10-30 degrees to determine multiple virtual locations (e.g., along a line, along a plane, etc.) that result in the sufficient arrival direction offset $\Delta\theta$. In some embodiments, arrival direction adjuster 428 is configured to determine the second virtual location 804b directly. In some embodiments, arrival direction adjuster 428 is configured to continuously determine or estimate the second virtual location 804b. In some embodiments, arrival direction adjuster 428 is configured to recalculate or update the second virtual location 804b in response to determining that the arrival direction offset Δθ is less than the 10-30 degree minimum offset. For example, arrival direction adjuster 428 can monitor a currently used arrival direction or virtual location of sound 810 and estimate the arrival direction offset Δθ between the currently used arrival direction of sound 810 and a currently estimated or calculated arrival direction of directional sound 814 to determine if the arrival direction offset Δθ is less than the 10-30 degree minimum offset.

Referring particularly to FIG. 6, delivery style adjuster 430 can be configured to use the environmental conditions or metadata as output by environmental audio condition manager 408 to determine one or more adjustments to speech presentation parameters, sound presentation parameters, audio signals, media, etc., to determine one or more speech or sound presentation parameters, or to determine a speech delivery mode of sound output by sound output device(s) 106 (e.g., if sound output device(s) 106 receive audio signals from a speech synthesizer).

In some embodiments, delivery style adjuster 430 can use the background noise level $A_{env}$ to change a delivery mode of a speech synthesizer (e.g., speech synthesis model 438). For example, delivery style adjuster 430 can compare the background noise level $A_{env}$ to multiple different ranges to determine a delivery mode of speech synthesis model 438. In some embodiments, each of the different ranges include a lower boundary (e.g., a lower threshold) and an upper boundary (e.g., an upper threshold). Each of the different ranges can correspond to a different delivery mode or delivery style of a speech synthesizer or a speech synthesis model. In some embodiments, if the background noise level $A_{env}$ is within a first range, delivery style adjuster 430 can select or determine that the speech synthesizer should operate according to a first mode (e.g., a normal mode). If the background noise level $A_{env}$ is within a second range, delivery style adjuster 430 can select or determine that the speech synthesizer should operate according to a second mode (e.g., a second delivery mode). If the background noise level $A_{env}$ is within a third range, delivery style adjuster 430 can select or determine that the speech synthesizer should operate according to a third mode (e.g., a third delivery mode).

Each of the different modes for the speech synthesizer can be predetermined or predefined modes that are tailored for different levels of background noise $A_{env}$. For example, each of the different modes can each include a different set of speech or sound presentation parameters. The speech or sound presentation parameters can include any of cadence, volume, speed of delivery, amplitude of particular phonemes, amplitude of particular frequencies, etc. In some embodiments, for example, controller 102 can monitor a frequency of background noise (as obtained by sound capture device(s) 104) and may select a delivery mode or adjust a speech or sound presentation parameter to facilitate improved perception of the sound output by sound output device(s) 106 (e.g., based on the frequency of the background noise and/or the background noise level $A_{env}$). For example, delivery style adjuster 430 may select a louder mode based on the background noise level $A_{env}$. In some embodiments, delivery style adjuster 430 is configured to select or update one or more speech or sound presentation parameters directly based on the background noise level $A_{env}$. For example, delivery style adjuster 430 may select from predetermined delivery modes or may continuously update/adjust speech or sound presentation parameters directly to achieve a speech synthesis model that is tailored to current environmental conditions to facilitate improved perceptibility of sound output by sound output device(s) 106.

In some embodiments, delivery style adjuster 430 is configured to use any of the amplitudes $Amp_1$, $Amp_2$, etc., to select a delivery mode or to adjust speech presentation parameters. For example, if the amplitudes indicate that environmental conditions are noisy for particular frequencies or particular frequency ranges, delivery style adjuster 430 can adjust the speech presentation parameters so that the environmental noise does not interfere with particular phonemes or sounds of the speech synthesis model or speech synthesizer. For example, delivery style adjuster 430 can determine that a particular set of phonemes may be difficult to hear given the amplitudes at different frequency ranges and can adjust an amplitude of phonemes that are identified as potentially difficult to perceive.

In some embodiments, delivery style adjuster 430 is also configured to adjust the delivery mode or speech presentation parameters based on the arrival direction θ (or $θ_1$, $θ_2$, and $θ_3$). For example, delivery style adjuster 430 may use specific modes or values of the speech presentation parameters for the speech synthesis model that are expected to improve perceptibility of sound output by sound output device(s) 106 given directional environmental/background noises.

In some embodiments, delivery style adjuster 430 is configured to use the user delivery level or the user delivery cadence as provided by environmental audio condition manager 408 or more specifically by user voice manager 446. In some embodiments, delivery style adjuster 430 may select a delivery style for speech synthesis model 438 that matches or corresponds to the user delivery level as detected by user voice manager 446. For example, if the user delivery level indicates that the user is shouting, delivery style adjuster 430 may select a mode or adjust speech presentation parameters so that the speech synthesis model 438 (as described in greater detail below with reference to FIG. 7) operates according to a "loud" or "projected" mode. In some embodiments, the user delivery level can be used as an indirect indicator of environmental/background noise (e.g., the Lombard effect). In some embodiments, for example, if the environment 120 is noisy, the user may elevate their voice which can be detected as a high or shouting user delivery level. Delivery style adjuster 430 may similarly select a mode or style of delivery (e.g., a delivery mode) or adjust speech presentation parameters to result in speech synthesis model 438 operating to generate matching cadence audio signals.

In some embodiments, delivery style adjuster 430 and speech synthesis model 438 (shown in FIG. 7 and described in greater detail below with reference to FIG. 7) are configured to cooperatively operate to indirectly affect or moderate user interactions. For example if the user delivery level indicates that the user is shouting, delivery style adjuster 430 can select a delivery mode for speech synthesis model 438 or select speech presentation parameters so that speech synthesis model 438 operates to provide synthetic spoken audio that is "quiet" or perceived by the user as a whisper. Likewise, if the user delivery cadence indicates that the user is speaking rapidly (e.g., with high cadence), delivery style adjuster can select a delivery mode for speech synthesis model 438 that has a low cadence.

In some embodiments, delivery style adjuster 430 can use a combination of the user delivery level, the user delivery cadence, and the environmental/background noise level $A_{env}$ to select the delivery mode or to determine or adjust speech presentation parameters for speech synthesis model 438. For example, if the environmental/background noise level $A_{env}$ indicates that the user is in a noisy environment (e.g., if the background noise level $A_{env}$ exceeds a threshold amount), and the user delivery level indicates that the user is shouting, delivery style adjuster 430 can select a delivery mode for speech synthesis model 438 that improves perceptibility of the audio/sound output by sound output device(s) 106 (e.g., a projected mode).

Referring still to FIG. 6, equalizer 426 is configured to determine one or more adjustment or adjusted amplitudes for sounds output by sound output device(s) 106 across different frequency ranges. For example, equalizer 426 may determine an adjustment for sounds across different ranges of frequencies, $Amp_{1,adj}$, $Amp_{2,adj}$, etc. In some embodiments, equalizer 426 uses the amplitudes $Amp_1$, $Amp_2$, etc., of audio or noises in the environment across different frequencies (e.g., different frequency ranges) to determine an adjusted amplification $Amp_{1,adj}$, $Amp_{2,adj}$, etc., for sound output device(s) 106 across the different frequencies. For example, if adjustment manager 410 identifies, based on the amplitudes $Amp_1$, $Amp_2$, etc., of the environmental audio, that there is a high frequency noise in the environment, equalizer 426 may determine an adjustment for the frequency range so that sound output device(s) 106 operate to provide amplified sound at the frequency range to facilitate improved perceptibility across specific frequency ranges.

Referring still to FIG. 6, modality adjuster 444 is configured to determine if a modality or mode in which information is provided to user 114 should be adjusted or changed based on the background/environmental noise level $A_{env}$ as detected by sound capture device(s) 104. In some embodiments, modality adjuster 444 is configured to compare the background/environmental noise level $A_{env}$ to a threshold value $A_{env,thresh}$ to determine if the modality should be changed. For example, if the background/environmental noise level $A_{env}$ is equal to or greater than the threshold value $A_{env,thresh}$, modality adjuster 444 may determine that the modality in which information is presented to the user should be transitioned from an aural modality to a visual modality. Likewise, if the background/environmental noise level $A_{env}$ is less than the threshold value $A_{env,threshold}$, modality adjuster 444 may determine that the modality should be maintained in or transitioned to an aural modality. In some embodiments, modality adjuster 444 is configured to output the modality as one of the adjustment(s).

Figure 7:
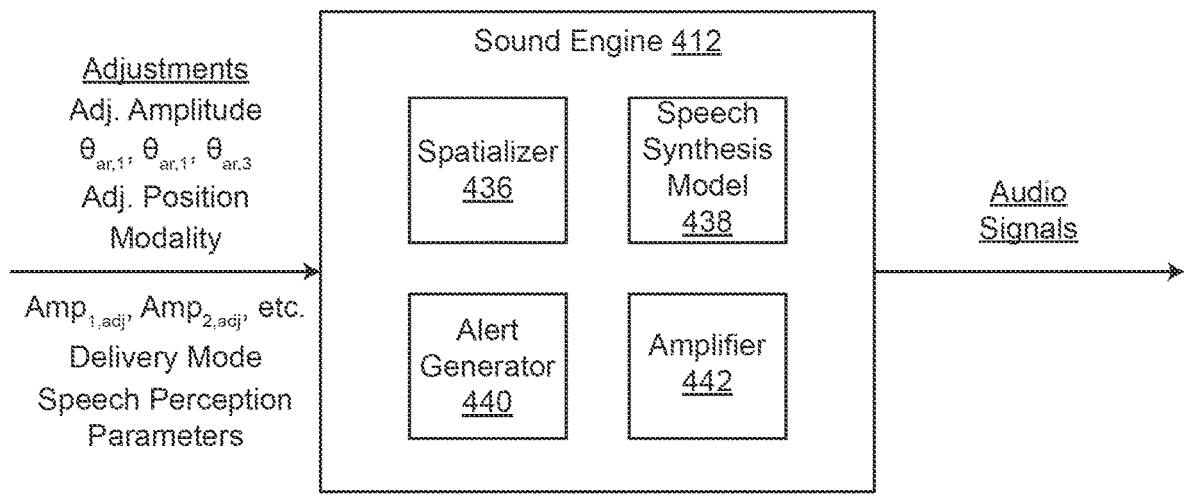
FIG. 7 is a block diagram showing a sound engine of the controller of FIG. 4 in greater detail, according to some embodiments.

Referring particularly to FIG. 7, sound engine 412 is shown in greater detail, according to some embodiments. Sound engine 412 is configured to receive the adjustment(s) from adjustment manager 410 and use the adjustment(s) to generate audio signal(s) for sound output device(s) 106. In some embodiments, sound engine 412 is configured to output the adjusted audio signal(s) that are used by sound output device(s) 106 directly to sound output device(s) 106. In some embodiments, sound engine 412 and adjuster 414 operate cooperatively to output the adjusted audio signal(s) that are provided to sound output device(s) 106. For example, adjuster 414 can be configured to perform any of the functionality of sound engine 412 as described herein to adjust audio signal(s) that are output by sound engine 412.

Referring still to FIG. 7, sound engine 412 includes a spatializer 436, a speech synthesis model 438 (e.g., a speech synthesizer, a neural network vocoder, etc.), an alert generator 440, and an amplifier 442. Spatializer 436 can be configured to perform a simulation to generate audio signals so that, when sound output device(s) 106 use the audio signals generated as a result of the simulation, the user perceives the sound originating from a virtual location (e.g., on the user's left shoulder, on the user's right shoulder, above the user, etc.). Speech synthesis model 438 can be configured to perform speech synthetization to generate audio signal(s) that, when used by sound output device(s) 106, provide spoken or simulated spoken audio to user 114 (e.g., a voice, spoken words, phrases, etc.). Alert generator 440 can be configured to generate audio signal(s) for alerts, tones, updates, notifications, etc. Amplifier 442 can be configured to adjust various audio signal(s) generated by any of spatializer 436, speech synthesis model 438, or alert generator 440 using the adjustment(s) provided by adjustment manager 410.

In some embodiments, speech synthesis model 438 is a speech synthesizer that builds a model of a person's speech generation, allowing for speculative synthesis of cadence and prosody. For example, speech synthesis model 438 can be configured to build a model based on audio obtained from sound capture device(s) 104 of spoken words, phrases, sentences, etc., of a user. In some embodiments, speech synthesis model 438 is configured to generate audio signal(s) for a variety of languages including tonal languages (e.g., where spoken relative/absolute pitch or tonality can affect meaning). Advantageously, speech synthesis model 438 can be configured to generate audio signal(s) that allow for realistic and synthetic delivery in any language.

Spatializer 436 can be configured to receive the adjusted position or the adjusted virtual location from adjustment manager 410 and use the adjusted virtual location to generate audio signal(s). In some embodiments, spatializer 436 is configured to generate audio signal(s) that, when used by sound output device(s) 106, result in the user perceiving the sound coming from or originating from the virtual location. In some embodiments, spatializer 436 uses the adjusted virtual location to maintain separation between an arrival direction of the simulated sound/noise and an arrival direction of environmental/background noises. For example, if arrival direction manager 420 detects multiple directional noises in the environment coming from a variety of different directions, arrival direction adjuster 428 may determine that the virtual location should be adjusted to a position where directional environmental noises do not originate (e.g., directly above the user). In one example, if arrival direction manager 420 determines that a directional noise is present in the environment and arrives to the user 114 at the user's right shoulder, arrival direction adjuster 428 may determine that spatializer 436 should use a virtual location at the user's left shoulder so that the user can perceive the sound output by sound output device(s) 106. Any of the functionality of spatializer 436 can be performed in combination with audio signal(s) generated by speech synthesis model 438, alert generator 440, or more generally, by sound engine 412. For example, sound engine 412 can generate audio signal(s) which may be used by spatializer 436 so that the audio signal(s) are perceived by the user 114 as arriving in a direction where environmental noises are suitably quiet.

Speech synthesis model 438 can be configured to use a speech synthesizer to generate spoken or vocal audio signal(s). In some embodiments, speech synthesis model 438 is configured to operate according to multiple predetermined modes of operation (e.g., different voices, difference cadences, different pronunciations, etc.). In some embodiments, each of the multiple predetermined modes of operation include one or more speech presentation parameters. In some embodiments, speech synthesis model 438 is configured to transition between the predetermined modes of operation or between different speech models based on the determined delivery mode, adjusted or updated speech presentation parameters, etc., as determined by adjustment manager 410 or the various components thereof. In some embodiments, speech synthesis model 438 is configured to operate continuously. For example, any of the speech presentation parameters can be updated continuously or in real-time based on adjustment(s) determined by adjustment manager 410 that are performed based on current or near-current environmental conditions. Speech synthesis model 438 can provide the audio signal(s) to spatializer 436 for spatialization (e.g., to facilitate improved perceptibility or to simulate the speech audio originating from a relatively quiet location relative to the user 114).

Alert generator 440 can be configured to generate audio signal(s) for alerts, notifications, message alerts, etc. In some embodiments, alert generator 440 is configured to provide the audio signal(s) for the alerts, notifications, message alerts, etc., to any of spatializer 436 and/or amplifier 442 so that the audio signal(s) can be adjusted, modified, changed, etc., using the functionality of spatializer 436 and/or amplifier 442. In some embodiments, alert generator 440 is configured to monitor the virtual location (e.g., the adjusted position used by spatializer 436 and as determined by arrival direction adjuster 428) and generate a notification or audio signal(s) for a notification when the virtual location is adjusted (e.g., from one position to another). In some embodiments, speech synthesis model 438 and alert generator 440 are configured to cooperatively operate to generate audio signal(s) to notify the user 114 when the virtual location used by spatializer 436 is adjusted or updated. For example, the alert or notification may be vocal audio. The vocal audio or the notification may indicate where the adjusted virtual location is (e.g., "Moving to left shoulder"). In some embodiments, the alert or notification are provided by operation of display device 434 as a visual alert, a visual notification, etc.

Amplifier 442 can be configured to adjust, modify, update, etc., the audio signal(s) generated by spatializer 436, speech synthesis model 438, or alert generator 440. In some embodiments, amplifier 442 is configured to increase a sound level of the audio signal(s) across all frequencies, or across particular frequency ranges or frequency bands. Amplifier 442 can receive the adjusted amplifications $Amp_{1,adj}$, $Amp_{2,adj}$, etc., and use the adjustments $Amp_{1,adj}$, $Amp_{2,adj}$, etc., to modify, update, or otherwise change/amplify the audio signal(s).

In some embodiments, sound engine 412 provides the audio signal(s) to adjuster 414. Adjuster 414 can be configured to also receive the adjustment(s) from adjustment manager 410 and modify, change, amplify, etc., the audio signals(s) according to the adjustment(s) as determined by adjustment manager 410. In some embodiments, the adjusted audio signal(s) are provided to sound output device(s) 106. Sound output device(s) 106 can use the adjusted audio signal(s) as output by sound engine 412 and/or adjuster 414 to provide sound to user 114.

Process

Figure 9:
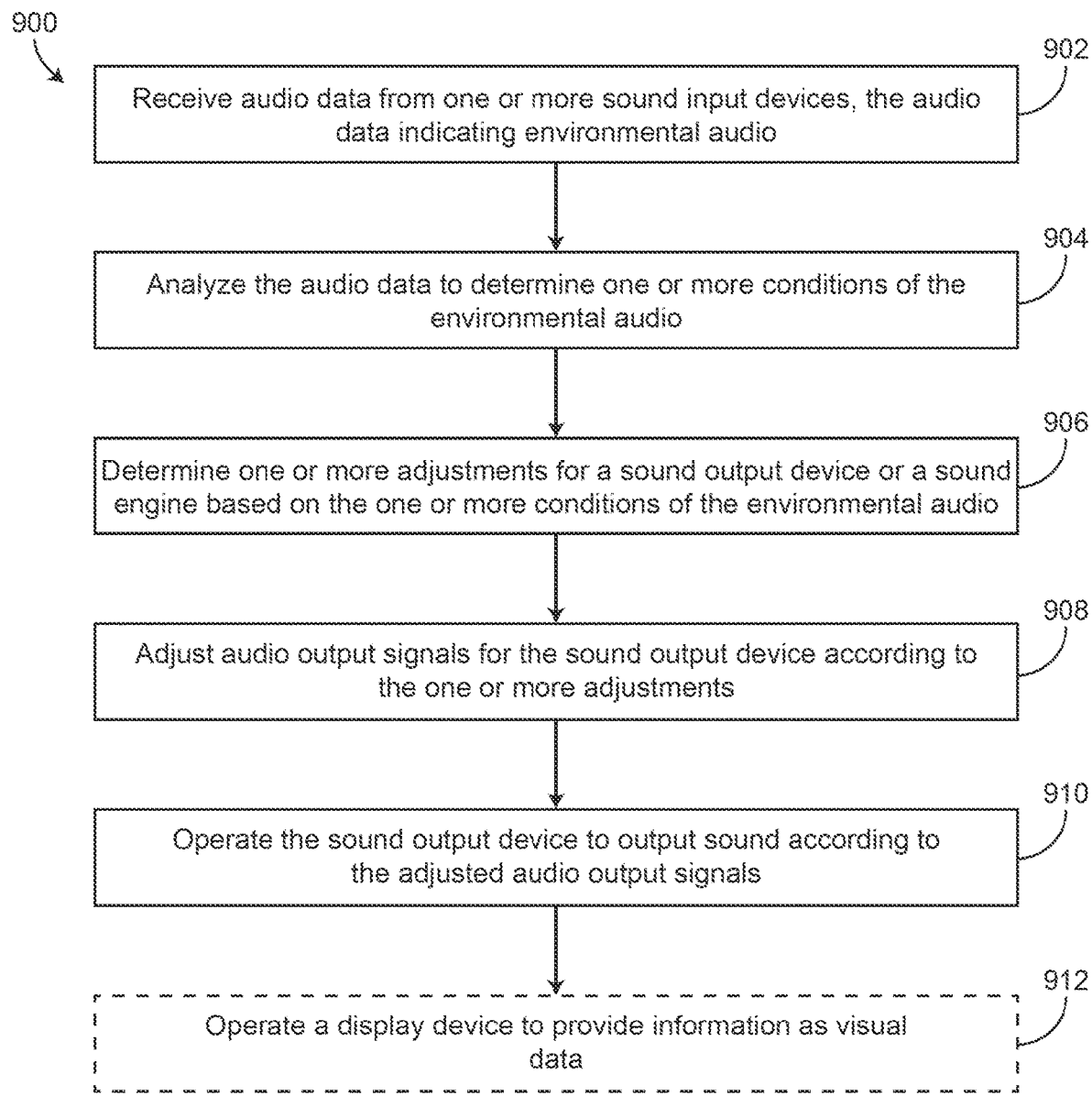
FIG. 9 is a flow diagram of a process for adjusting audio output of an audio system to account for environmental noises, according to some embodiments.

Referring particularly to FIG. 9, a flow diagram of a process 900 for adjusting sound output of an audio system to account for environmental audio conditions or to improve perceptibility of the sound output is shown, according to some embodiments. Process 900 includes steps 902-912 and can be performed by an audio system (e.g., system 100). Advantageously, process 900 can be performed in real-time or near real-time to provide continuous improved perceptibility of the sound output by the audio system. In some embodiments, step 912 is optional.

Process 900 includes receiving audio data from one or more sound input devices (e.g., microphones), the audio data indicating environmental audio (step 902), according to some embodiments. Step 902 may be performed by sound capture device(s) 104. In some embodiments, the audio system includes a single sound input device. In other embodiments, the audio system includes multiple sound input devices. Step 902 may be performed to provide processing circuitry with audio data that indicates environmental, background, or ambient noise (e.g., directional noises, constant background noise, etc.).

Process 900 includes analyzing the audio data to determine one or more conditions of the environmental audio (step 904), according to some embodiments. In some embodiments, step 904 is performed by processing circuitry, a processor, multiple processors, etc. In some embodiments, step 904 is performed by processing circuitry 402 of controller 102, or more specifically, by environmental audio condition manager 408. In some embodiments, step 904 includes using the audio data obtained from the one or more sound input devices (e.g., as obtained in step 902) to determine any of a background noise level (e.g., in dB), a background or environmental noise level in different frequency ranges, an arrival direction of directional background/environmental noises, etc.

Process 900 includes determining one or more adjustments for a sound output device or a sound engine based on the one or more conditions of the environmental audio (step 906), according to some embodiments. In some embodiments, step 906 is performed by adjustment manager 410. The one or more adjustments may include an amplification for the sound output device, an amplification for the sound output device for particular frequency ranges, a virtual location or an adjusted virtual location for a spatializer, an arrival direction or an adjusted arrival direction for sound produced by the sound output devices or the sound engine, an adjustment to one or more speech or sound presentation parameters (e.g., if the sound engine is or includes a speech synthesis engine), etc. In some embodiments, adjustments are determined that improve a perceptibility of sound output by the sound output device. For example, if a background noise level meets a particular threshold, the sound output by the sound output device may be amplified. Likewise, for directional noises in the environment, a virtual location of a spatializer may be adjusted so that a user of the system experiences the sound output originating from a direction that is sufficiently separated from an arrival direction of the direction environment/background noise.

Process 900 includes adjusting audio output signals for the sound output device according to the one or more adjustments (step 908), according to some embodiments. In some embodiments, step 908 is performed by sound engine 412 and/or adjuster 414 of processing circuitry 402. Step 908 can include performing a simulation with a spatializer to generate audio signals for the sound output devices. In some embodiments, the simulation is performed with the virtual location or a virtual location that results in the arrival direction as determined in step 906. Step 908 can also include adjusting, modifying, or otherwise changing audio signals that are generated by the sound engine. For example, step 908 may include amplifying the audio signals across all frequencies or amplifying portions of the audio signals across particular frequency ranges so that when the sound output devices are operated (in step 910) to provide sound or produce noises according to the adjusted audio output signals, perceptibility of the sound is improved. Step 908 can also include generating or adjusting audio output signals using adjusted speech or sound presentation parameters. For example, step 908 may include using a speech synthesizer to generate vocal or spoken audio signals using the adjusted speech or sound presentation parameters. The speech or sound presentation parameters may be any of cadence, tone, volume, speed, emotion, speech delivery style, etc.

Process 900 includes operating the sound output device to output sound according to the adjusted audio output signals (step 910), according to some embodiments. In some embodiments, step 910 includes providing the adjusted audio signals to sound output device(s) 106 so that sound output device(s) 106 operate to provide, produce, or output the sound. Step 910 can be performed by sound output devices 106 of system 100.

Process 900 includes operating a display device to provide information as visual data (step 912), according to some embodiments. In some embodiments, step 912 is optional. Step 912 can be performed by display manager 432. For example, one of the adjustments determined in step 906 may include a modality or a manner in which information is provided to the user. The modality may be adjusted from an aural modality to a visual modality in response to the background noise level exceeding a threshold amount. For example, if the background/environmental noise level is so high that a user would not be able to accurately hear sounds (e.g., when information is presented to the user according to the aural modality through operation of the sound output device(s)), step 906 may include determining that the modality of the system should be transitioned from the aural modality to the visual modality so that the information is visually displayed to the user. In some embodiments, step 912 is only performed if the system that performs process 900 includes a visual display device such as a screen, a combiner, AR glasses, a VR headset, etc.

Figure 10:
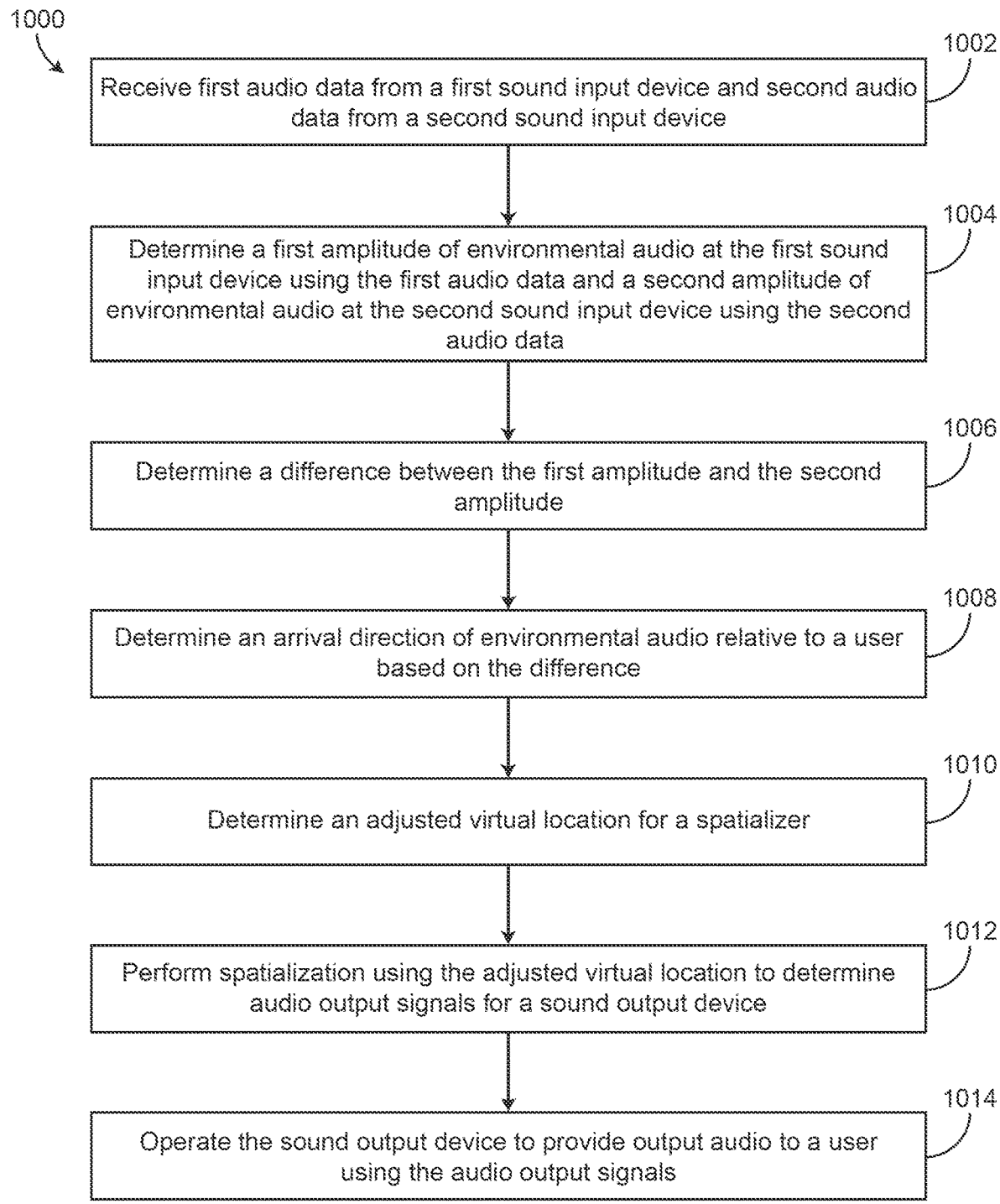
FIG. 10 is a flow diagram of a process for determining an arrival direction of an environmental noise and adjusting a spatializer to account for the arrival direction of the environmental noise, according to some embodiments.

Referring particularly to FIG. 10, a flow diagram of a process 1000 for determining an arrival direction of background/environmental noise and adjusting an audio output of an audio system to account for the background/environmental noise is shown, according to some embodiments. Process 1000 includes steps 1002-1014 and can be performed by system 100. In some embodiments, process 1000 is performed to determine the arrival direction θ for use in determining a virtual location for a simulation to improve perceptibility of sound output of the system.

Process 1000 includes receiving first audio data from a first sound input device (e.g., a first microphone) and second audio data from a second sound input device (e.g., a second microphone) (step 1002), according to some embodiments. In some embodiments, the first sound input device is spatially positioned a distance away from the second sound input device. The first sound input device and the second sound input device can be at least partially positioned in an environment where uncontrolled sounds may originate. In some embodiments, the first sound input device and the second sound input device are environment facing microphones that are positioned along a structural member or a housing of an audio device. The first sound input device and the second sound input device can be first sound capture device 104a and second sound capture device 104b, respectively, as shown in FIG. 2. The first sound input device may be configured to obtain audio or audio data at the first spatial location that indicates a first amplitude of the environmental noise (e.g., a directional noise) while the second sound input device may be configured to obtain audio or audio data at the second spatial location that indicates a second amplitude of the environmental noise (e.g., a directional noise). In some embodiments, step 1002 is performed by sound capture device(s) 104 and controller 102.

Process 1000 includes determining a first amplitude of environmental audio at the first sound input device using the first audio data and a second amplitude of environmental audio at the second sound input device using the second audio data (step 1004), according to some embodiments. In some embodiments, step 1004 is performed by first sound capture device 104a and second sound capture device 104b. In some embodiments, step 1004 is performed by amplitude detector 416 of processing circuitry 402 based on the audio data obtained from the first sound input device and the second sound input device. For example, amplitude detector 416 can use the audio data to detect an amplitude at each of the first sound input device and the second sound input device (e.g., at different spatial locations).

Process 1000 includes determining a difference between the first amplitude and the second amplitude (step 1006), according to some embodiments. In some embodiments, step 1006 is performed by arrival direction manager 420. In some embodiments, the first amplitude is referred to as $A_1$ and the second amplitude is referred to as $A_2$. Arrival direction manager 420 can be configured to determine a difference $\Delta A$ where $\Delta A = A_1 - A_2$. In some embodiments, an amplitude of the directional sound or the environmental noise is proportional to or related to a distance between where the directional sound originates. For example, the first sound input device may be positioned a first distance $r_1$ from where the directional sound originates while the second sound input device may be positioned a second distance $r_2$ from where the directional sound originates. The amplitudes $A_1$ and $A_2$ may indicate the first distance $r_1$ and the second distance $r_2$. In some embodiments, arrival direction manager 420 is configured to use the amplitudes $A_1$ and $A_2$ to determine, calculate, estimate, etc., an arrival direction of the environmental sound or the environmental audio.

Process 1000 includes determining an arrival direction of environmental audio relative to a user based on the difference determined in step 1006 (step 1008), according to some embodiments. In some embodiments, step 1008 is performed by arrival direction manager 420. Arrival direction manager 420 can use the difference $\Delta A$ to estimate, calculate, an arrival direction θ of the directional sound. For example, arrival direction manager 420 can use a predetermined relationship, a function, a graph, a chart, a set of instructions, etc., to determine or estimate the arrival direction θ of the environmental or background noise based on the difference $\Delta A$. In some embodiments, step 1008 uses the first amplitude $A_1$ and the second amplitude $A_2$ directly to estimate the arrival direction θ.

Process 1000 includes determining an adjusted virtual location for a spatializer (step 1010), according to some embodiments. In some embodiments, step 1010 is performed by arrival direction adjuster 428, or more generally, by adjustment manager 410. The adjusted virtual location can be a location from which a sound that will be provided by the sound producing device(s) is simulated to originate from. In some embodiments, the virtual location is determined so that a minimum angular separation between an arrival direction of a sound simulated by the spatializer and the directional background/environmental sound maintain at least 10-30 degrees of separation to facilitate improved perceptibility of the sound simulated to originate from the virtual location.

Process 1000 includes performing a spatialization process using the adjusted virtual location to determine audio output signals for a sound output device (step 1012), according to some embodiments. In some embodiments, step 1012 is performed by sound engine 412, or more particularly, by spatializer 436. In some embodiments, the spatialization process is a simulation to generate audio signals so that when sound output devices operate according to the audio signals, the user perceives the sound as originating from the virtual location.

Process 1000 includes operating the sound output device to provide output audio to a user using the audio output signals as determined in step 1012 (step 1014), according to some embodiments. In some embodiments, step 1014 is performed by sound output device(s) 106. Step 1014 can include providing output audio to user 114 by operating sound output device(s) 106 using the adjusted audio signal(s).

Privacy Settings for Mood, Emotion, or Sentiment Information

In particular embodiments, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 100 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular embodiments, the system 100 may use a user's previous activities and calculated moods, emotions, or sentiments to determine a present mood, emotion, or sentiment. A user who wishes to enable this functionality may indicate in their privacy settings that they opt in to the system 100 receiving the inputs necessary to determine the mood, emotion, or sentiment. As an example and not by way of limitation, the system 100 may determine that a default privacy setting is to not receive any information necessary for determining mood, emotion, or sentiment until there is an express indication from a user that the system 100 may do so. By contrast, if a user does not opt in to the system 100 receiving these inputs (or affirmatively opts out of the system 100 receiving these inputs), the system 100 may be prevented from receiving, collecting, logging, or storing these inputs or any information associated with these inputs. In particular embodiments, the system 100 may use the predicted mood, emotion, or sentiment to provide recommendations or advertisements to the user. In particular embodiments, if a user desires to make use of this function for specific purposes or applications, additional privacy settings may be specified by the user to opt in to using the mood, emotion, or sentiment information for the specific purposes or applications. As an example and not by way of limitation, the system 100 may use the user's mood, emotion, or sentiment to provide newsfeed items, pages, friends, or advertisements to a user. The user may specify in their privacy settings that the system 100 may determine the user's mood, emotion, or sentiment. The user may then be asked to provide additional privacy settings to indicate the purposes for which the user's mood, emotion, or sentiment may be used. The user may indicate that the system 100 may use his or her mood, emotion, or sentiment to provide newsfeed content and recommend pages, but not for recommending friends or advertisements. The system 100 may then only provide newsfeed content or pages based on user mood, emotion, or sentiment, and may not use that information for any other purpose, even if not expressly prohibited by the privacy settings.

Privacy Settings for User-Authentication and Experience-Personalization Information In particular embodiments, the system 100 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 100. The user's privacy settings may specify that such information may be used only for particular processes, such as authentication, and further specify that such information may not be shared with any third-party system or used for other processes or applications associated with the system 100. As another example and not by way of limitation, the system 100 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the system 100. As another example and not by way of limitation, the system 100 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the system 100.

Configuration of Illustrative Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system comprising:
   a sound output device; and
   processing circuitry configured to:
   determine, based on environmental audio obtained from a microphone, at least one of an amplitude of a user's voice, an arrival direction of environmental sound, and a cadence of the user's voice;
   adjust, based on at least one of the amplitude of the user's voice, the arrival direction of the environmental sound, or the cadence of the user's voice, (i) a virtual spatial position of a spatial audio simulation by simulating a sound at the virtual spatial position relative to the sound output device, and (ii) one or more sound presentation parameters to decrease a cadence of speech output with increased values of the cadence of the user's voice; and
   operate the sound output device to output audio according to the one or more sound presentation parameters at the virtual spatial position and provide an animation to the user that the virtual spatial position is adjusted.

2. The system of claim 1, further comprising adjusting the one or more sound presentation parameters based on at least one of:
   an amplitude of the environmental audio; or
   an amplitude of the environmental audio within one or more particular frequency ranges.

3. The system of claim 2, wherein the one or more particular frequency ranges comprise frequency ranges that are relevant to an intelligibility or perceptibility of the audio that is output by the sound output device.

4. The system of claim 1, wherein the processing circuitry is configured to obtain environmental audio from a first microphone and a second microphone and:
   compare input audio of environmental audio captured by the first microphone to input audio of the environmental audio captured by the second microphone to determine the arrival direction of the environmental audio relative to the system as one of one or more properties of the environmental audio.

5. The system of claim 1, wherein the sound presentation parameters comprise an adjustment to an amplitude or a cadence of a speech synthesizer, the processing circuitry configured to use the speech synthesizer to operate the sound output device to output the audio.

6. The system of claim 5, wherein the processing circuitry is configured to increase the amplitude of the speech synthesizer in response to increases in the amplitude of the user's voice, increases in the amplitude of the user's voice indicating hearing difficulty.

7. The system of claim 5, wherein the processing circuitry is configured to decrease the amplitude of the speech synthesizer in response to increases in the amplitude of the user's voice.

8. A method for adjusting audio output, the method comprising:
   obtaining environmental audio from a microphone of an audio device;
   analyzing the environmental audio to identify an amplitude and a cadence of a user's voice and an arrival direction of environmental sound;
   adjusting, based on at least one of the amplitude of the user's voice, the arrival direction of the environmental sound, or the cadence of the user's voice, (i) a virtual spatial position of a spatial audio simulation by simulating a sound at the virtual spatial position relative to the audio device, and (ii) one or more sound presentation parameters of a speech synthesizer for an audio output to decrease a cadence of speech output of the speech synthesizer with increased values of the cadence of the user's voice; and
   operating a sound output device to output audio using the speech synthesizer at the virtual spatial position.

9. The method of claim 8, wherein adjusting the one or more sound presentation parameters further comprises adjusting the one or more sound presentation parameters based on at least one of:
   an amplitude of the environmental audio;
   the amplitude of the environmental audio within a particular frequency range; or
   an arrival direction of the environmental audio relative to the audio device.

10. The method of claim 9, further comprising:
    obtaining environmental audio from a first microphone of the audio device;
    obtaining environmental audio from a second microphone of the audio device; and
    comparing the environmental audio obtained from the first microphone to the environmental audio obtained from the second microphone to determine the arrival direction of the environmental audio relative to the audio device;
    wherein the first microphone is positioned a distance from the second microphone.

11. The method of claim 9, further comprising providing an aural notification to a user that the virtual spatial position is adjusted.

12. The method of claim 8, wherein adjusting the one or more sound presentation parameters comprise a cadence or an amplitude of the speech synthesizer.

13. A method for adjusting audio output, the method comprising:
    obtaining environmental audio data from a microphone;
    determining an arrival direction of environmental audio relative to an audio device;
    adjusting a virtual spatial position of a spatial audio simulation based on the arrival direction of the environmental audio to continuously maintain at least a predetermined amount of separation between an arrival direction of spatial audio generated by the spatial audio simulation relative to the arrival direction of the environmental audio; and providing the audio output to a user and an aural notification comprising a spoken phrase to the user that the virtual spatial position is adjusted.

14. The method of claim 13, wherein the spatial audio simulation comprises simulating a sound at the virtual spatial position relative to the audio device to generate an audio output.

15. The method of claim 13, wherein the environmental audio data is obtained in real-time.

16. The method of claim 13, further comprising:
determining an amplitude of the environmental audio based on at least one of the environmental audio data obtained from the microphone;
determining an amplitude of the environmental audio that is within a particular frequency range based on based on at least one of the environmental audio data obtained from the microphone; and
adjusting the audio output provided to the user based on at least one of the amplitude of the environmental audio or the amplitude of the environmental audio that is within the particular frequency range.

17. The method of claim 16, wherein adjusting the audio output comprises at least one of:
adjusting an amplitude of the audio output;
adjusting a frequency or pitch of the audio output; or
adjusting an amplitude of the audio output across a frequency range.

* * * * *